United States Patent
Cyr et al.

[11] Patent Number: 5,819,014
[45] Date of Patent: *Oct. 6, 1998

[54] PARALLEL DISTRIBUTED PRINTER CONTROLLER ARCHITECTURE

[75] Inventors: Thomas J. Cyr, Townsend; Thomas Dundon, Bolton; Brian Manser, Stow, all of Mass.; Carl E. Rehebein, Nashua, N.H.

[73] Assignee: Digital Equipment Corporation, Maynard, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 751,061

[22] Filed: Nov. 15, 1996

Related U.S. Application Data

[63] Continuation of Ser. No. 428,850, Apr. 25, 1995, which is a continuation of Ser. No. 232,844, Apr. 25, 1994, which is a continuation of Ser. No. 46,345, Apr. 8, 1993, which is a continuation of Ser. No. 506,450, Apr. 6, 1990.

[51] Int. Cl.⁶ .................................................. G06K 15/00
[52] U.S. Cl. ............................................. 395/114; 395/112
[58] Field of Search ........................... 395/114–116, 828, 395/829, 830, 834, 882; 345/502, 503, 504–506; 358/444–445, 450, 462, 467; 400/68, 76

[56] References Cited

U.S. PATENT DOCUMENTS

| | | |
|---|---|---|
| 4,381,553 | 4/1983 | Ferguson . |
| 4,415,986 | 11/1983 | Chadra . |
| 4,651,278 | 3/1987 | Herzog et al. . |
| 4,809,216 | 2/1989 | Lai . |
| 4,825,402 | 4/1989 | Jalali . |
| 4,881,180 | 11/1989 | Nisliyama ................................ 395/114 |
| 4,944,614 | 7/1990 | Tanaka ....................................... 400/68 |
| 4,949,280 | 8/1990 | Littlefield ................................. 395/163 |
| 4,989,163 | 1/1991 | Kawamata et al. ....................... 395/115 |
| 4,992,957 | 2/1991 | Aoyama et al. .......................... 395/114 |
| 4,992,958 | 2/1991 | Kageyama et al. ....................... 395/114 |
| 5,010,514 | 4/1991 | Kippenhan et al. ..................... 364/900 |
| 5,047,955 | 9/1991 | Shope et al. ............................. 395/114 |
| 5,075,874 | 12/1991 | Steeves et al. ........................... 395/112 |
| 5,109,520 | 4/1992 | Knierim ................................... 395/163 |
| 5,179,637 | 1/1993 | Nardozzi .................................. 395/114 |

*Primary Examiner*—Arthur G. Evans
*Attorney, Agent, or Firm*—Ronald C. Hudgens; Michael A. Rodriguez

[57] ABSTRACT

A printer architecture utilizing network resources to distribute printer controller and translator functions and thereby process several print jobs in parallel. The several print jobs can be transferred, in order of completion, to a print engine for a high speed real time printing operation, or stored as pre-rasterized images for subsequent access and delivery to the print engine.

9 Claims, 21 Drawing Sheets

PARALLEL DISTRIBUTED PRINTER CONTROLLER ARCHITECTURE

This application is a continuation of application Ser. No. 08/428,850, filed Apr. 25, 1995, which is a continuation of application Ser. No. 08/232,844, filed Apr. 25, 1994, which is a continuation of application Ser. No. 08/046,345 filed Apr. 8, 1993, which is a continuation of 07/506,450 filed Apr. 6, 1990.

FIELD OF THE INVENTION

This invention relates to a printer architecture and, more particularly, to a system capable of driving a production or high speed printer at relatively high speeds for any type of data.

BACKGROUND OF THE INVENTION

Typically, in the prior art, printing systems bundle the processing, copy and print phases of printing into a single component. When data is actually to be printed, the rate at which the printer can print is dependent on the data type, its complexity and the computer processing power available for the data computations.

Generally, a print system receives a "job" to be printed. The job is all of the data that is to be printed and can be stored either in electronic form or received as hard copy, such as publications or manuscripts which are "scanned" into the printing system. Each job is formatted in the system in a page description language (PDL) such as PostScript file, ANSI, ASCII, PCL etc.

A simplified block diagram of such a prior art printer is shown in FIG. 1 and can be, for example, a Kodak 1392 Model 24 printer rated at 92 pages per minute and 300 dots per inch (dpi) or a Siemens ND50 printer rated at 50 pages per minute. As shown in FIG. 1, the printer 7 includes a print engine 9 coupled directly to a controller 3. The printer 7 receives the data input over bus 5. The controller 3 accepts the input data 5, in the non-rasterized page description language format, and processes the input data into a rasterized image as, e.g., a bit map. The rasterized image is then fed to the print engine 9 for printing.

A problem with this type of printing system is that the processing time in the controller 3 to rasterize the data and transfer it to the print engine can be excessive and slow the print engine's ability to print the data at its full rated speed, i.e., the print engine cannot receive data as fast as it can print. For example, uncomplicated data such as ASCII text can easily be translated at speeds greater than the print engine can print. However, if the complexity of the data is increased to include PostScript files and graphics, then the rasterization speed is greatly reduced. Thus, the print system cannot operate in "real-time" as would be advantageous to process and print extremely large amounts of data.

One known attempt to operate in real-time employs a single CPU image translator to translate the PDL to an image format. However, the CPU image translator is tightly coupled with the printer controller thus preventing the processing and printing from being independent operations. This method is satisfactory for slow print engines. However, for high production print engines, the CPU image translator is not capable of generating rasterized images fast enough for the printer. The result is that the print engine must pause and wait for more data.

A further problem with traditional printing systems is that jobs are sent serially to the controller 3, which is specifically designed to translate the job to a printable image. As the jobs are input in series to the printer, a bottleneck forms at the printer 7. For example, if job "A" is being translated to a rasterized image by the controller 3, job "B" must wait for the processing to complete before it may be processed. In both instances, neither job is printing and the print engine 9 remains idle thus wasting resources.

SUMMARY OF THE INVENTION

The present invention addresses these problems by providing a high speed printer architecture system adopted to operate the high speed printers at their relatively high rated speeds for any data type. The printer architecture is useful in high speed printing situations such as production/demand delivery or publication printing systems. Further, the architecture is operable either as a "real-time" or an "archival" publishing system.

The printer architecture utilizes network resources to create a "distributed" printer controller or translator. By distributing the translators across the network, print jobs may be processed in parallel, and either printed directly for "real-time" operation or stored for "archival" operation. A distributed set of the translators is used for each data type, the translators each comprising a plurality of CPU's to simultaneously rasterize each data type. In real-time operation, each translator on the network can formulate the rasterized image which is then fed over the network to the print engine. This dramatically increases the flexibility of the printing system by allowing slow jobs to be processed while quicker jobs are completed and printing.

The system can also include levels of buffers to temporarily store rasterized images for input to the printer as soon as the printer is available to print another job.

In the archival mode, print jobs may be processed and stored in a storage device. The storage device can then be accessed and its contents delivered to the print engine. In this manner, pre-rasterized jobs stored in the storage device are fed directly to the print engine for printing. In both real-time and archival modes, the printer architecture can feed the rasterized images to the print engine at the print engine's full rated speed. The pre-rasterized images stored in the storage device can be accessed by the system, at any time prior to printing, for data manipulation of the rasterized image, as, e.g., to change fonts, graphic details, background etc. and then stored once again. The ability to perform graphic processing to the bit map of a job, rather than manipulate a PDL representation of the job, greatly expands the flexibility and versatility of the print system according to the present invention.

It is another advantage of the present invention to utilize data compression of the rasterized images for reducing the bandwidth requirements of the network. Each print job is formulated into a compressed bit map using standard compression algorithms. The compressed bit map is either stored in the storage device in the archival mode or fed directly to the print engine in the real-time mode. At the printer, the compressed bit map is decompressed, placed into a local memory, and then fed to the print mechanism upon request. In this manner, network bandwidth requirements are reduced by the signal compression and the printer can operate at its rated speed on low bandwidth networks.

DETAILED DESCRIPTION

Printer Architecture

Figure 1:
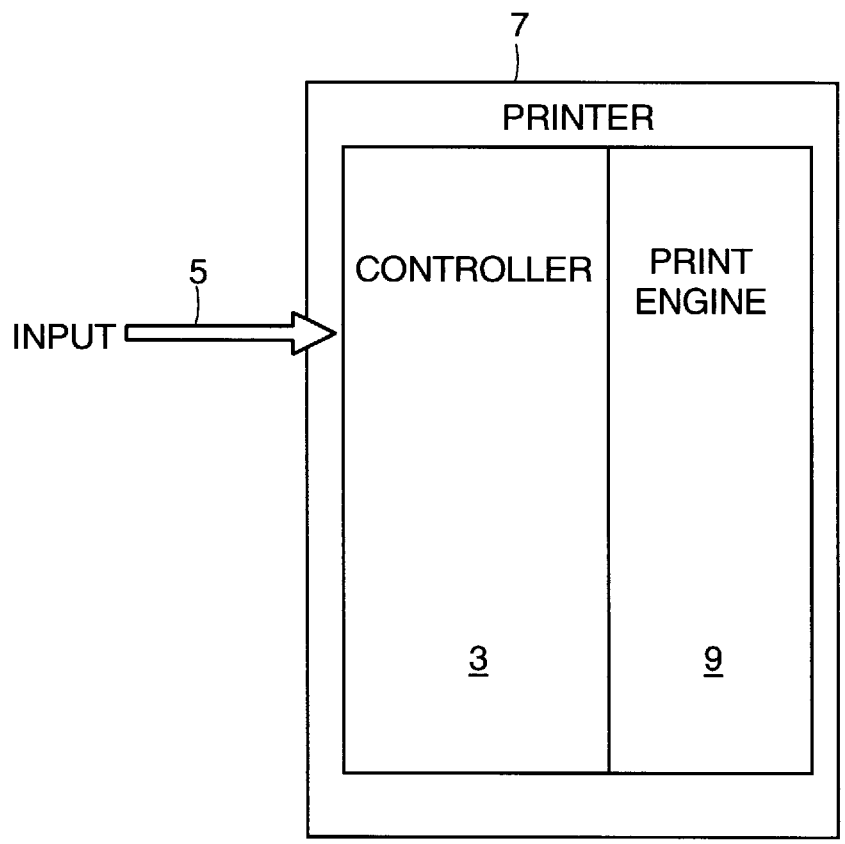
FIG. 1 is a block diagram of a prior art printer system.
Figure 2:
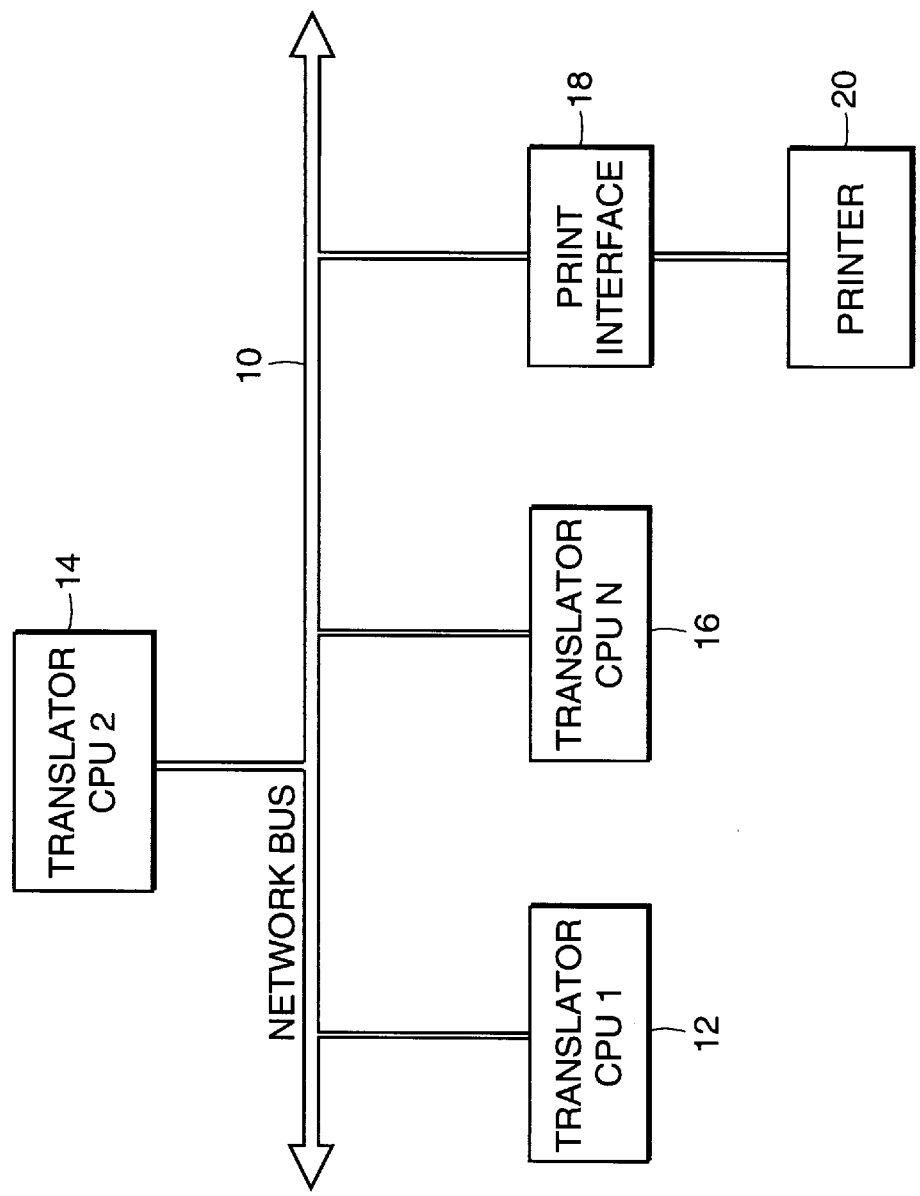
FIG. 2 is a block diagram of the present invention.

Referring to FIG. 2, there is shown the printer system controller architecture of the present invention which includes a network bus 10, such as an Ethernet bus, coupling together a number of translators 12, 14, 16 with a print interface 18 and printer 20. Each of the translators 12, 14, 16 can be a multi-processor system capable of translating various data types to a rasterized image format. The implementation of the data translation is performed by industry standard techniques. For example, the PostScript file translator would follow the defacto standard contained in the Postscript Language Reference Manual by Adobe Systems Inc. (published by Addison-Wesley Inc.) which describes the syntax of the Adobe defined PostScript file language. The rasterized image is then transferred from the translators 12, 14 and 16 over the network bus 10 to the print interface 18.

Figure 3:
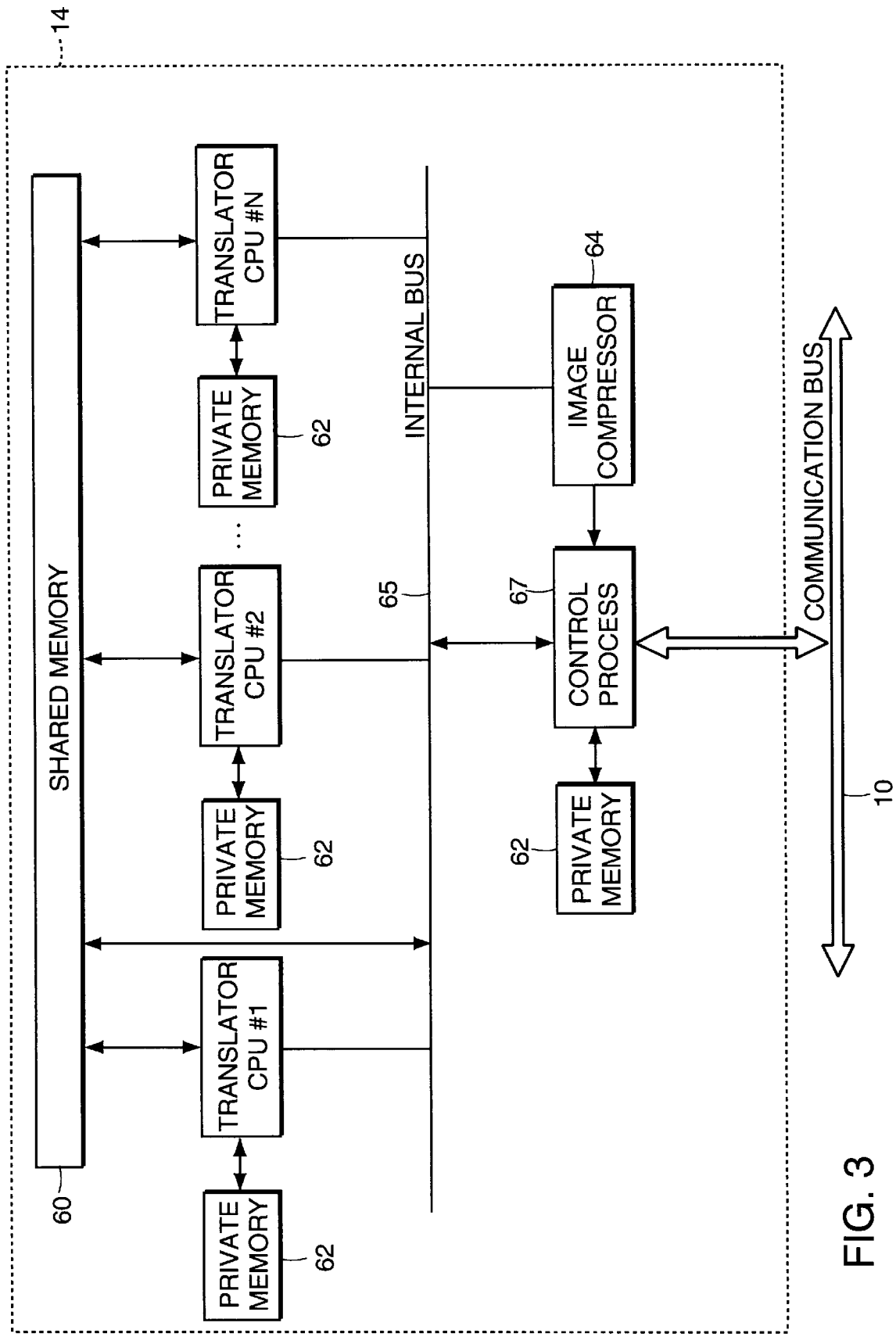
FIG. 3 is a block diagram of a translator shown in FIG. 2.

FIG. 3 shows in block diagram form the hardware organization for a typical translator 14. The translator 14 includes multiple CPU systems (CPU's 1–N), each of which is a separate subsystem containing both shared memory 60 and private memory 62. The multiple CPUs are coupled via an internal bus 65 and provide the ability to process multiple pages of data simultaneously. Hence, data pages can be rasterized faster than the printer's print speed provided enough CPU's are used in the multiple CPU system.

The shared memory 60 typically contains common program instructions and data, e.g., symbols, that are shared across all of the CPU's. The private memory 62 contains information unique to the particular page or pages of data currently being rasterized by the CPU.

In a preferred embodiment, an image compressor 64 is coupled to the internal bus 65 of each translator to allow each of the translators 12, 14 and 16 to compress the rasterized image into a compressed bit map which is transferred across the network 10. The compression algorithms can be any standard type of compression algorithm such as CCITT Groups 3 and 4. The use of the image compressor 64 helps achieve the high speed printing by reducing the bandwidth required of the network bus 10.

By using the network resources, such as translators 12, 14, 16, the required controller functions, including rasterization of images, can be distributed throughout the network. Hence, parallel processing of print jobs can be performed which alleviates the bottleneck at the printer controller encountered in the prior art. Thus, a slow print job can be processing while a quicker one is completed and delivered to the printer 20. This allows the printer 20 to print at its full rated speed.

The compressed bit maps sent from the translators 12,14, 16 to the print interface 18 (FIG. 2) for each job are decompressed, placed into the printer interface's 18 local memory and are then fed to the printer 20 as requested. Thus, the printer 20 can operate in real-time because of the parallel processing capability of the distributed translators 12, 14, and 16. (The software operation to achieve the real-time printing is more fully described below.)

The distributed translators thus allow multiple print jobs to be translated into rasterized format in parallel. For example, if job "A" is a large Postscript file, it can be processed while job "B" e.g., a short ASCII document, is translated and fed to the printer 20.

In addition, any of the translators 12, 14, 16 may be upgraded for higher performance by simply allocating more system or network resources to their use. Further, the use of compressed bit map images allows any type of printer 20, e.g., Kodak 1392, Siemens ND 50, etc., to be adapted to accept the compressed bit map image input.

The control process 67 also shown in FIG. 3 provides all communication in or out of a respective translator 12,14,16 and controls the sequence of translation operations within the translator. Additionally, the control process has the ability to arbitrate symbols that are undefined among the CPUs in the translator 12,14,16. The control process 67 also: maintains communication with the print controller 25 (see FIG. 4);

provides error control and conditioning; manages wait states; and provides notification of which wait conditions have been satisfied within the respective translator 12,14, or 16.

For instances of undefined symbols or commands, the control process 67 provides a locking function to stall a CPU until the symbol definition is resolved and placed in the shared memory 60. Once the undefined symbol is resolved, all waiting CPU's are notified of the symbol definition and resume their execution. The control process 67 additionally contains a tracking ability to determine if a CPU has been stalled for an extended period of time, i.e. an error has occurred and the translation process must be terminated. This information is required because of the independent operations being performed by the different CPUs in the translator. The control process 67 further performs page prefetch or lookahead functions for the CPU's and assigns each CPU a section of data to translate. Upon completion of printing of a job, the control process 67 notifies the print controller 25 of this (see FIG. 4).

As pages are rasterized and compressed, the control processor 67 places them into a print wait queue in the proper order. A request for the printer is then made from the print controller 25 and, once granted, the job setup and print information is sent to the printer. If the printer is busy printing another job, the next job's images are placed in a wait queue until enough job images are waiting to assure continuous operation of the printer. The translator CPU's are then issued a stall command to stop translating. The control process 67 then notifies the printer interface 18 of its wait condition and waits until a wakeup message is received from the printer interface 18.

Figure 4:
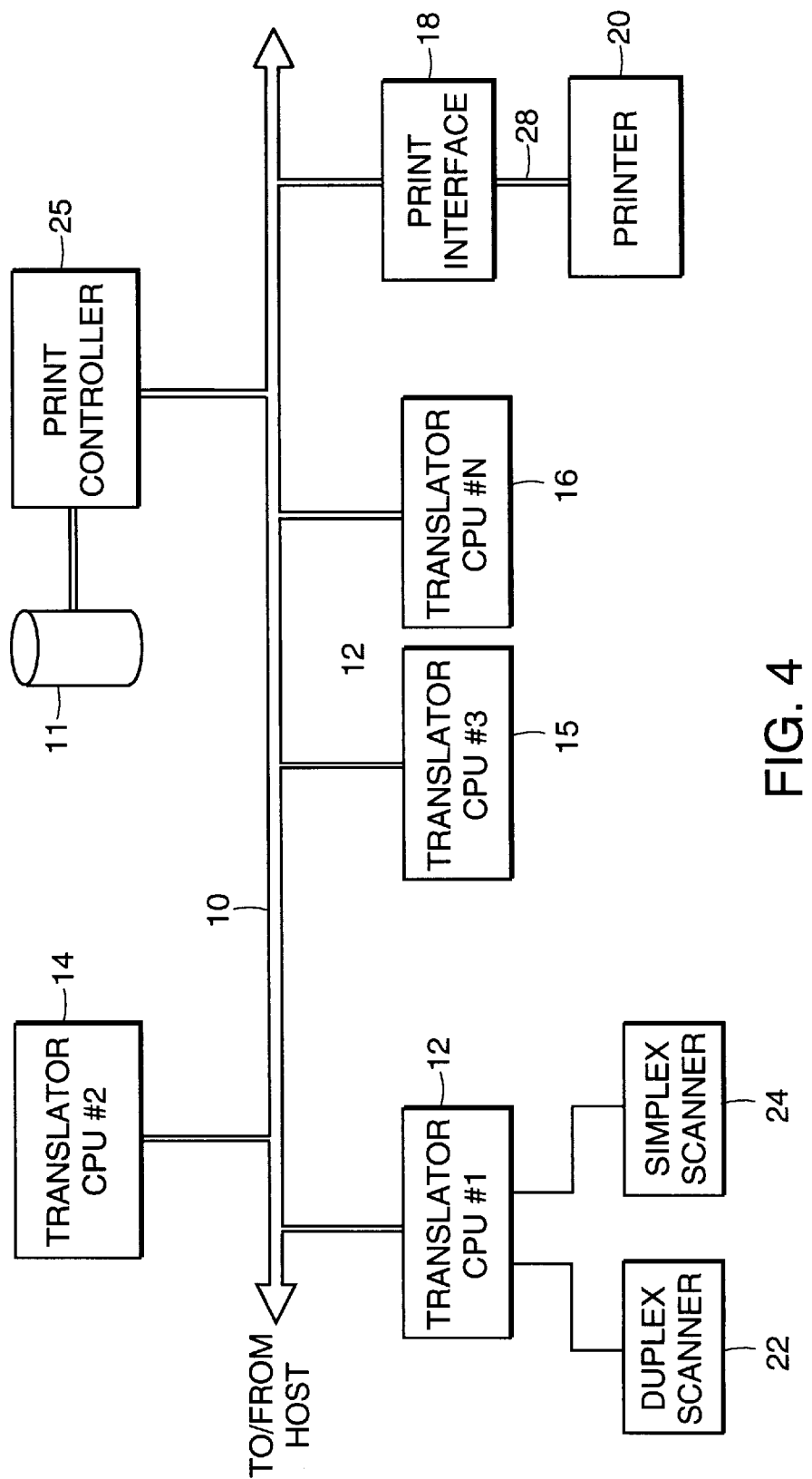
FIG. 4 is a block diagram of another embodiment of the present invention.

FIG. 4 shows another embodiment of the printer architecture used in the archival mode of printing. The network bus 10 again couples the translators 12, 14, 15 and 16 with the print interface 18 and printer 20. Further, as shown in this embodiment, translator 12 is coupled to a simplex scanner 24 and a duplex scanner 22. A storage device 11 is coupled to the bus 10 through a print controller 25.

In this architecture, as more fully described below, an archival mode of operation is available wherein the translators 15, 16 process the page description language into a raster image which is then stored in the storage device 11 via the print controller 25. By using the scanners 22 and 24 hard copies of documents can be input into the system. The translator 12 interprets the page description language scanned into the system and constructs a raster image which is also stored in the storage device 11. In this manner, print jobs can be processed and stored while awaiting printing. Once the printer 20 is activated, the print jobs are retrieved from storage 11 by the print controller 25 and fed across the network bus 10 to the print interface 18 for printing. Thus, the printer 20 can operate at relatively high speed because the print jobs have previously been processed into raster images. The stored rasterized images can also be accessed at any time for further editing and graphics processing, if desired, before printing, as will be described in more detail below.

Alternatively, with archival publishing, the print jobs may be processed to rasterized images overnight and stored. Then, when an operator is available, the print jobs may be printed at high speed.

Figure 5:
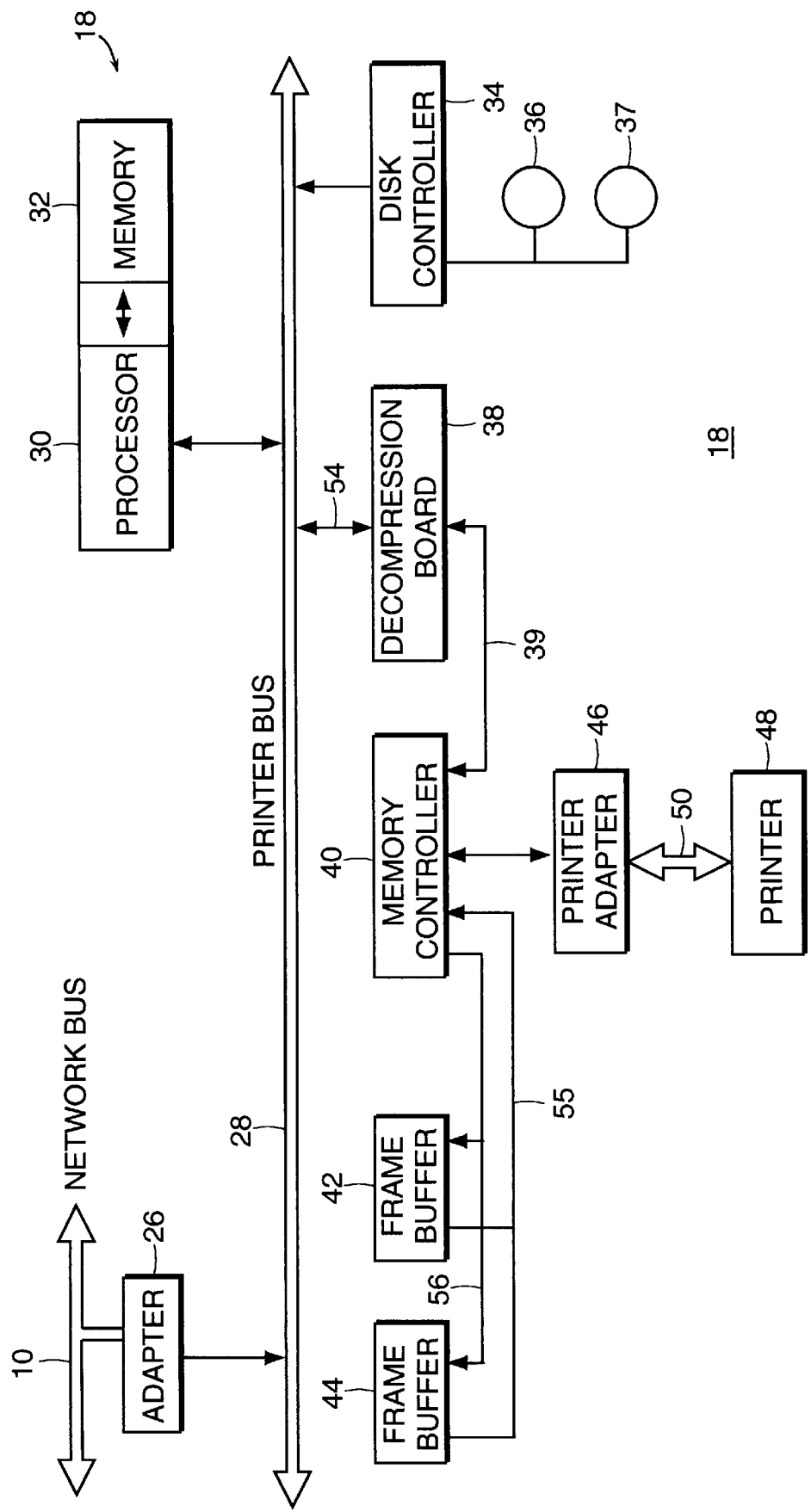
FIG. 5 is a block diagram of the print interface of the present invention.

FIG. 5 shows the components of the printer interface 18. The printer interface 18 includes an adapter 26 interfacing between the network bus 10 and the printer bus 28. Also coupled to the printer bus 28 is a processor 30, decompression board 38 and disk controller 34. The processor 30 is coupled to its processor memory 32 while the disk controller 34 controls access to its local storage disks 36 and 37. The decompression board 38 is coupled over a backport bus 39 to a memory controller 40. The memory controller 40 further couples over its backport bus 56 to frame buffers 42 and 44. In turn, frame buffers 42 and 44 are coupled by separate link 55 back to the memory controller 40. A printer 48 is coupled to the memory controller 40 through a bulkhead 46 and cable 50.

In operation, the compressed bit map images are received from the network bus 10 through the adapter 26. The adapter serves as a communications device to interface with the network. The print job is then sent over print us 28 to the local disks 36 and 37 through the disk controller 34. The disks 36 and 37 serve to cache each job as a local mass storage.

When it is desired to print a job, the processor 30 retrieves the job from the local disk memories 36 and 37 and caches m image pages into local processor memory 32 in preparation for printing the job. During the printing of the job, the image caching in the local memory 32 is maintained. The processor 30 forwards the image pages from the local memory 32 over the printer bus 28 to the decompression board 38. The decompression board expands the compressed bit map to its full raster image. The decompression board 38 performs standard decompression of the CCITT Groups 3 and 4 compression algorithms. The board can use, for example, the decompression chip sold by Advance Micro Devices, Model VCEP.

The decompressed raster image is then passed over the high speed backport data link 39 to the memory controller 40. The memory controller 40 stores a single page of the print job, alternately, in each frame buffer 42 and 44 over link 56. The memory controller 40 further accesses each page, alternately, from the frame buffers 42 and 44, over a separate link 55 and transfers them to the printer adapter 46.

The printer adapter 46 performs a single level translation in accordance with the specifications provided for the particular printer 48. Further, the printer adapter 46 isolates the image signal from noise and other disturbances. The printer adapter 46 then transfers the image to the print engine 48 over cables 50.

The printer interface 18 thus provides several levels of buffering of the raster image which allows the printer to print at its full rated speed. Each print job is buffered at the job level in the local disks 36 and 37, at the multiple page level in processor memory 32, and at a single page level in the frame buffers 42 and 44.

Figure 6:
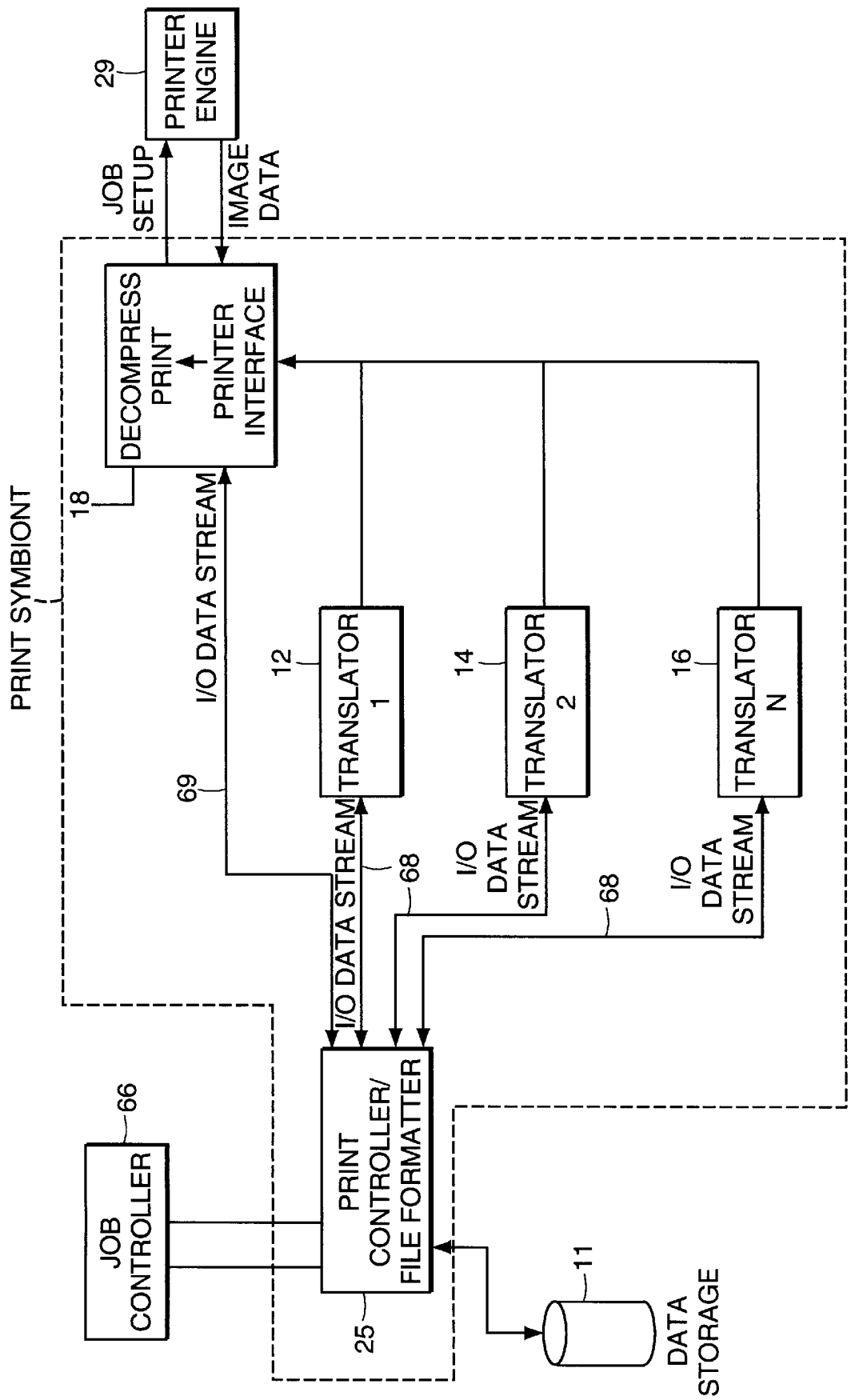
FIG. 6 is a software and hardware flow diagram of the present invention.

To further understand the operation of the invention, FIG. 6 is a software and hardware flow diagram for the print system illustrated in FIG. 4. The system includes a print controller 25, (FIGS. 4 and 6) coupling I\O data streams 68, 69 which represent data transmissions over the network bus 10 (FIG. 4) to the translators 12, 14, 16 and printer interface 18.

The print controller subsystem 25 maintains communications between a user interface job controller 66, which utilizes the operating system, e.g. the VMS operating system, to send commands to the print controller 25, and remaining translator subsystems 12,14,16 to insure an orderly flow of information between the components. Further, the print controller can store and retrieve pre-rasterized images from the data storage 11. In particular, the print controller 25 establishes an I\O data communication stream 68 with each data translator and an I\O stream 69 with the printer interface 18. This I\O data stream 69 exists for the pre-rasterized images ready for immediate printing and stored in the storage device 11. The print controller 25 coordinates the assignment of one of the translators to the printer interface 18 for the printing of a print request for a document in PDL format that originates from the system job controller 66. The controller 25 further passes PDL data to the assigned translator for processing. Upon completion of the job, the controller 25 returns status information to the system job controller 66.

Upon receipt of a print request from the system job controller 66 for a source document in a PDL format, the print controller 25 decodes all the print options and performs an initial job setup. Once the job is accepted for printing, the print controller 25 assigns the appropriate translator to perform data translation and provides setup information to the printer interface 18. On a periodic basis, the print controller 25 makes inquiries of the translators 12,14,16 and printer interface 18 to insure the subsystems are online and operational.

Because of the multiple translators, each translator having separate I\O data streams, it is possible to process data independently while printing data already rasterized into an image. As such there is a need for the print system to maintain operational states. These states coordinate the initialization and flow of the data from the translator and storage system to the printer.

Figure 7:
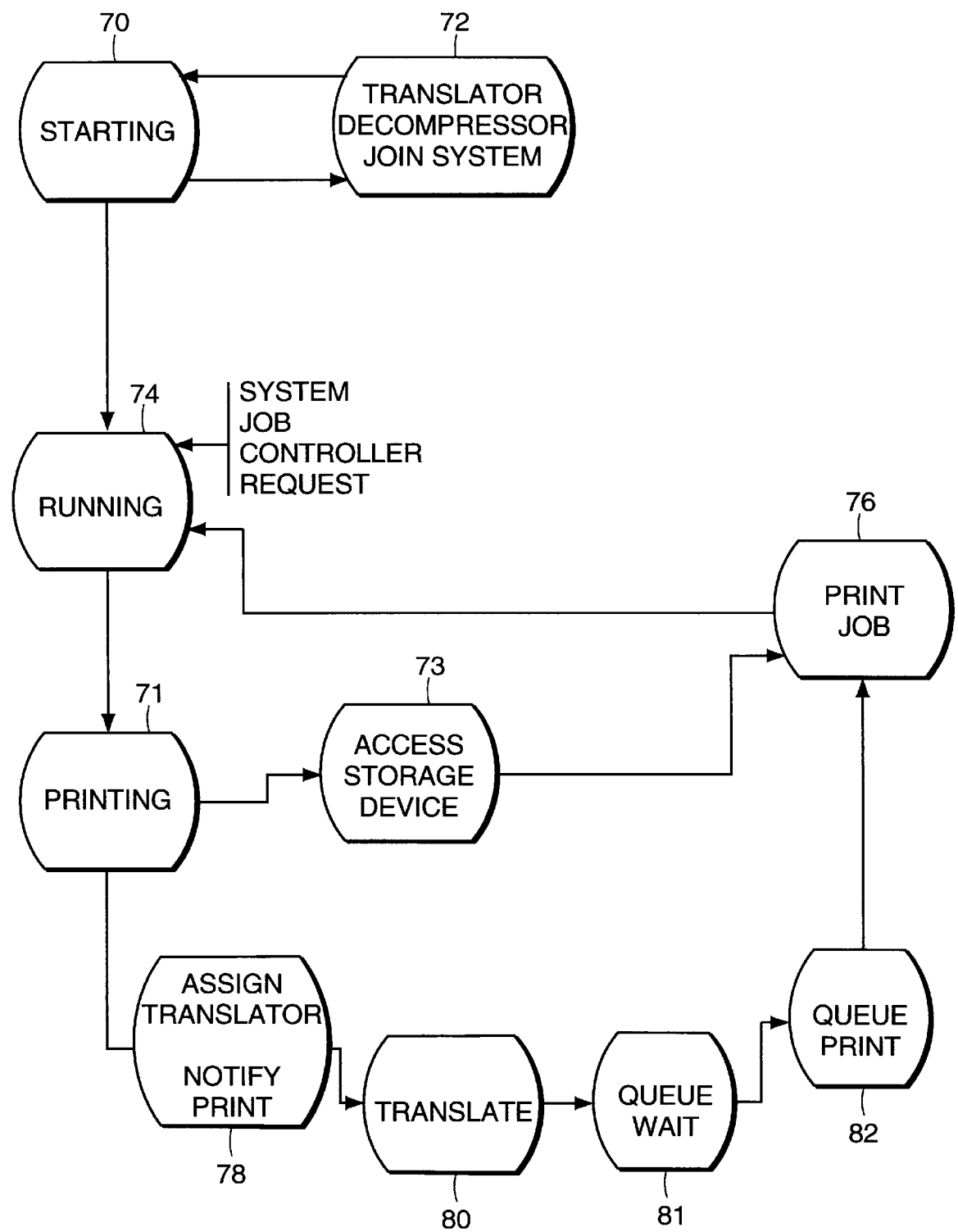
FIG. 7 is a state diagram showing the operational states of a print controller according to the present invention.

The distinct states in which the print controller 25 can be placed are illustrated in the state diagram of FIG. 7. The starting state 70 is the initial state when the software is first loaded on the system. The print controller 25 is started by the system job controller 66. At this request, the translators 12, 14, 16 are queried (state 72) to determine if they are running. If they are not, the print controller 25 commences a start up sequence to load the software into the translators and to start them. As each translator initializes itself, it sends a startup message to the print controller 25. Each translator operating online identifies its data translating capability and is associated with an I\O data stream 68. If at least one translator and the printer interface 18 respond, then the print system goes to the running state 74.

The running state 74 indicates the print system is capable of receiving requests to print or process data of some type on the printer 20. The system then awaits a request from the system job controller 66.

The printing state 71 indicates the print system has received a request to print some data on the printer 20. The request will identify the source document as either a pre-rasterized image stored in the storage device 11 or a document represented in a PDL format. If the source document is in a PDL format, the print controller 25 assigns a free translator (state 78) to the task of translating the PDL data to a rasterized image and the translator commences the operation (state 80) as will be described in more detail below. Thus, there can be a different print request for source documents in PDL format, active in each of the translators 12, 14, 16 of the print system. If the source document is a pre-rasterized image in the storage device 11, the print controller 25 enters state 73 to access the pre-rasterized image from the storage device 11 for transmission to the printer interface 18 (state 76).

Prior to the print state 76, each translator 12,14,16 will compose a job setup message that will be passed to the printer interface and subsequently the printer engine (FIG. 6). This information will include the print options as well as job size information. This information is placed in a pending print queue (state 81) for placement in a print queue (state 82) to await printing. If the printer is currently available, the printer commences printing immediately.

Figure 8:
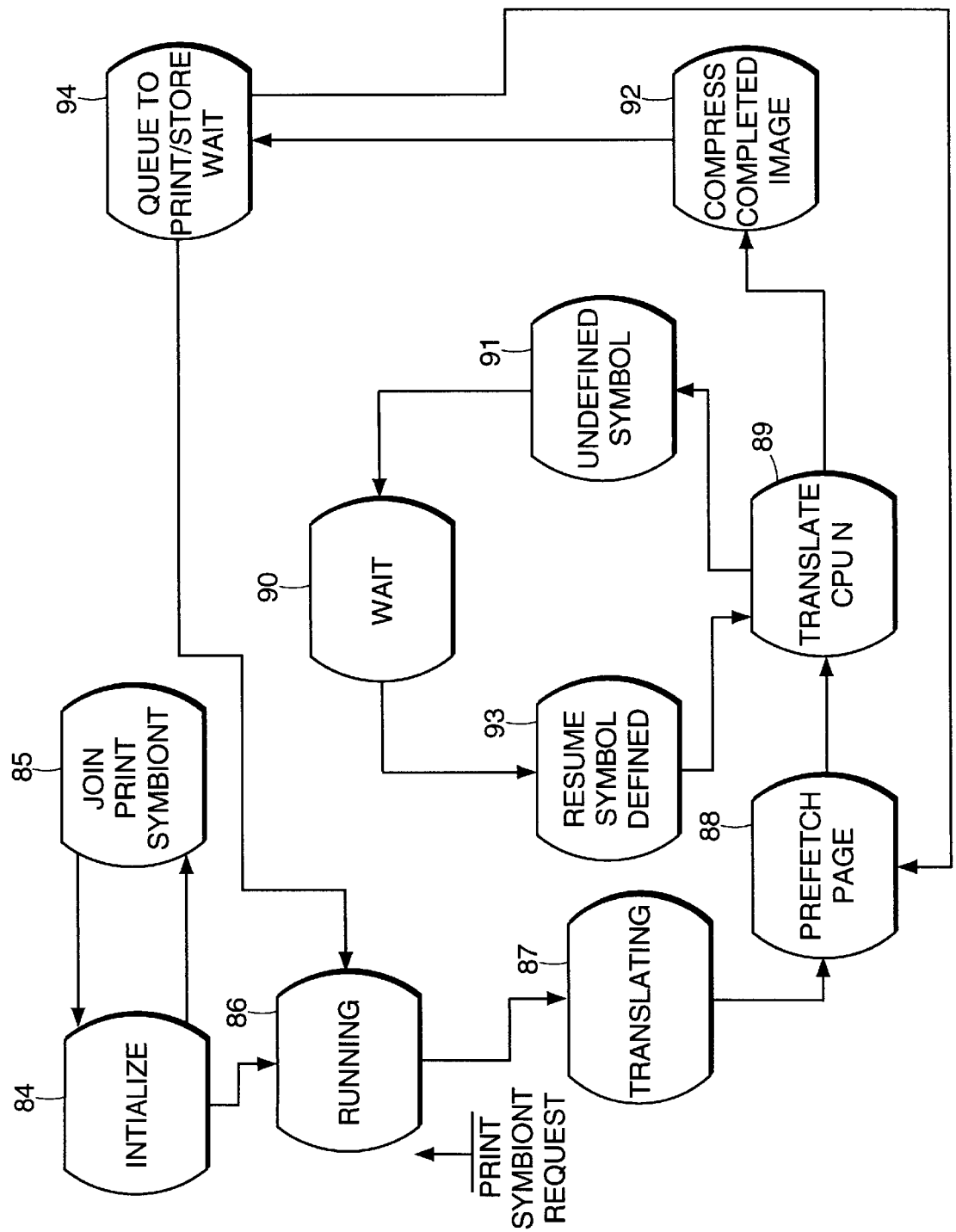
FIG. 8 is a state diagram showing the operational states of a translator according to the present invention.

To control the flow of information within each translator 12, 14 and 16 of FIGS. 2, 3 and 4, a series of states or conditions must be maintained. FIG. 8 shows a state diagram of the different states within each translator 12, 14 and 16. The translator begins in the initializing state 84, from a program load or when it is waiting to associate itself as an available translator with the print controller 25 (state 85). The running state 86 indicates the translator is ready to accept data for translation, e.g. a print request. The translating states 87–89 occur when pages are being translated to image data. The states 87–89 will exist for each CPU (I-N) within the respective translator 12,14,16.

In the waiting state 90, a CPU in the translator has reached an operation or symbol believed to be in error or undefined (state 91). At this time, the CPU places itself in a wait state pending a wakeup message from the control processor 67. This state exists for each CPU within the translator. The resume state 93 occurs when a CPU translator has been resumed by the control processor 67 after a wait condition. Additional status information would then be made available to indicate the reason the CPU was resumed, such as to indicate the symbol or operation had been defined and is legal or alternatively to stop the translation operation due to an error.

The multi-processor translators 12, 14,16 perform the actual translation of data to image (i.e. PostScript file to bitmap, etc). The translator CPU's function to: rasterize a page of data to an image as it is received from the control processor 67; report all error conditions to the control processor 67; and, as each page of data is rasterized, request that the page be compressed and sent to the print wait queue (FIG. 8, 94) for output to the printer interface 18.

The compression process is the final component of the translator subsystem. It functions to: accept the uncompressed image from the translator CPU; compress the image as requested (state 92, FIG. 8); and return the compressed image to the control process for printing. At this stage a completion status message is provided to the CPU translator process and the control process.

Exemplary software which can be used to control the communication, formatting and printing within the printer architecture of the invention as illustrated in FIG. 4 will now be described. This software for operating the printing system according to the present invention can be divided into two parts: a file formatting program and a print symbiont subsystem. The file formatting program converts files that are in a page description language (PDL) into an image file. The print symbiont subsystem controls the actual printing of the image files. The file formatting program operates primarily in each translator 12,14,16 and the print symbiont subsystem operates in the printer interface 18, print controller 25 and translators 12, 14, 16, in real time operation, and primarily in the printer interface 18, in the archival mode of operation.

File Formatter

Figure 9A:
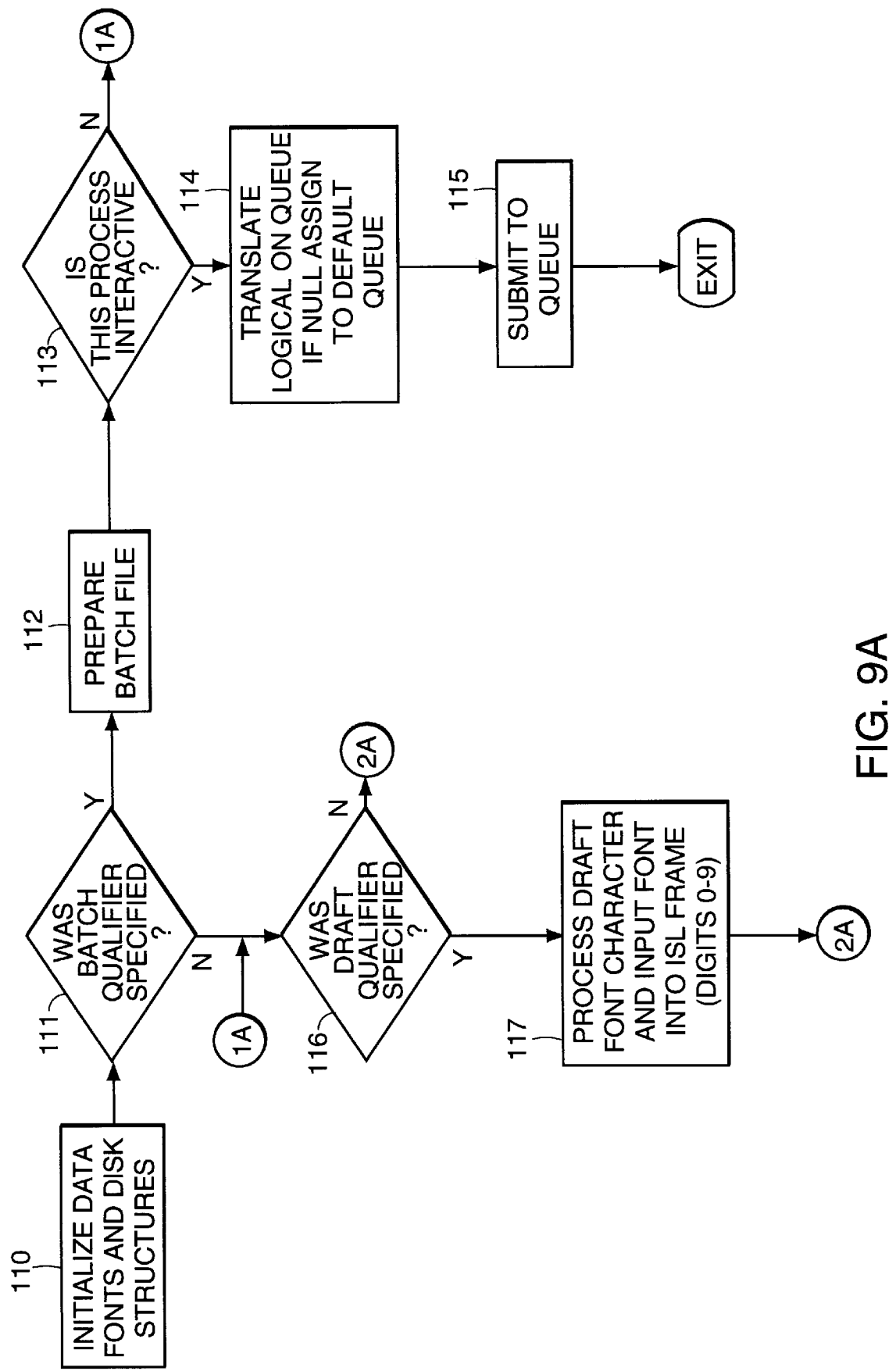
FIGS. 9(A)–(F), in combination, form a flow chart of file formatting software according to the present invention.

Referring to FIG. 9A, the flow diagram for the initialization operation for the file formatting program is shown. To start the operation of the file formatting program, a formatting request is created which includes several printer qualifiers (e.g. page size, double spacing, two-sided printing, etc.). The file formatting program first initializes its own data fonts and disk structures in block 110. Data fonts refer to the capability of actually putting page numbers on document pages while the pages are stored as image files. Disk structures refer to the format for saving image and text data on disk (i.e. an index map). An input file, which can be in a PDL or bit image format, is located in memory and can now be easily accessed by the file formatting program. Control of the program then passes to decision block 111. If the input file is to be processed as a batch file, control of the program goes to block 112 to prepare for a batch file. This batch file will include all of the qualifiers in the formatting request. Control then passes to decision block 113. If the input file is to be processed interactively, control passes to block 114 where the program creates the actual batch file. Control goes to block 115 where the program submits the batch file to the printer queue and the program ends. If the input file is not to be processed interactively, then the job has already been submitted and is effectively running. Control then passes from block 113 to decision block 116.

If the input file is not to be processed as a batch file in decision block 111, control also passes to block 116. If the file is to be processed as a draft, control passes to block 117. In block 117, the program takes all the fonts and image utilities and imports them into what's called an "image services frame" which is used for cutting and pasting images into final form. These image utilities can come from a set of utilities used for image manipulation. An example is the applications services marketed under the name DECImages. The draft format also allows the user to input page numbers for the image. Each page of image data for printing is a composite of several images. A draft page is an image having a user entered page number. After setting up the draft image, program control passes to block 120 (FIG. 9B).

Figure 9B:
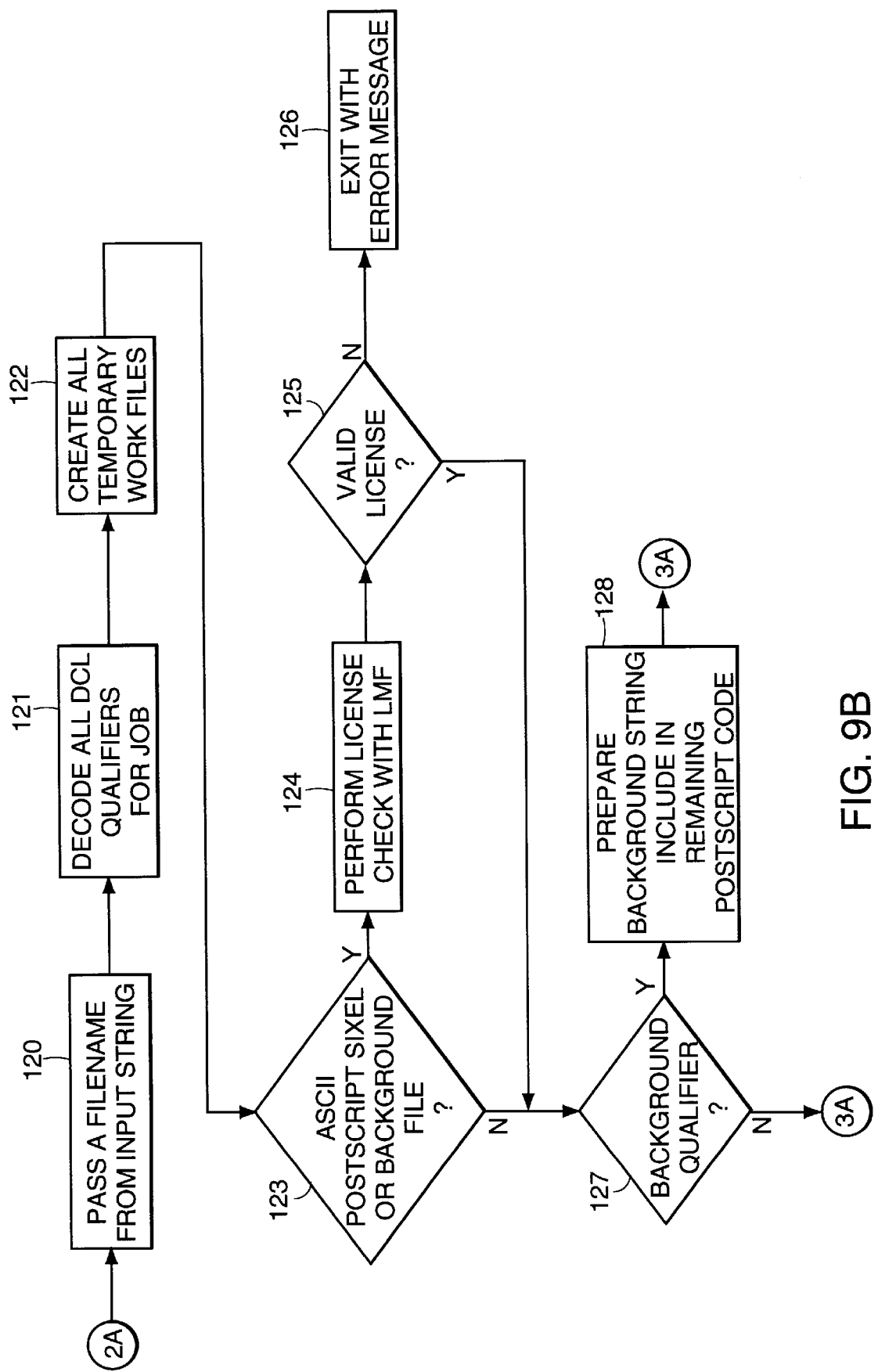

Referring to FIG. 9B, in block 120, the program checks the file name of the input file for errors. Then, in block 121, all qualifiers for the file are decoded and set up in the program. These qualifiers include whether the document is to be printed single or double sided and what backgrounds will be used in the final document. In block 122, temporary work files are created for the processing of the input file.

The program decides whether the file is in an ASCII, PostScript file, PCL, or background format in decision block 123. If it is, then control passes to block 124 to perform a license check on the user. In decision block 125, the program decides whether the user has a valid license to continue with the running of the program. If the user does not have a license, then the program is exited and an error message is printed in block 126. If the user does have a valid license, then control passes to decision block 127. In decision block 127, the program decides whether a background qualifier was specified by the user and was set. If it has, control passes to block 128, and the program takes the background text prepared for the file being processed. The program prepares a background image using the background text. These background images are eventually overlaid with the text image data and the optional draft pages.

Figure 9C:
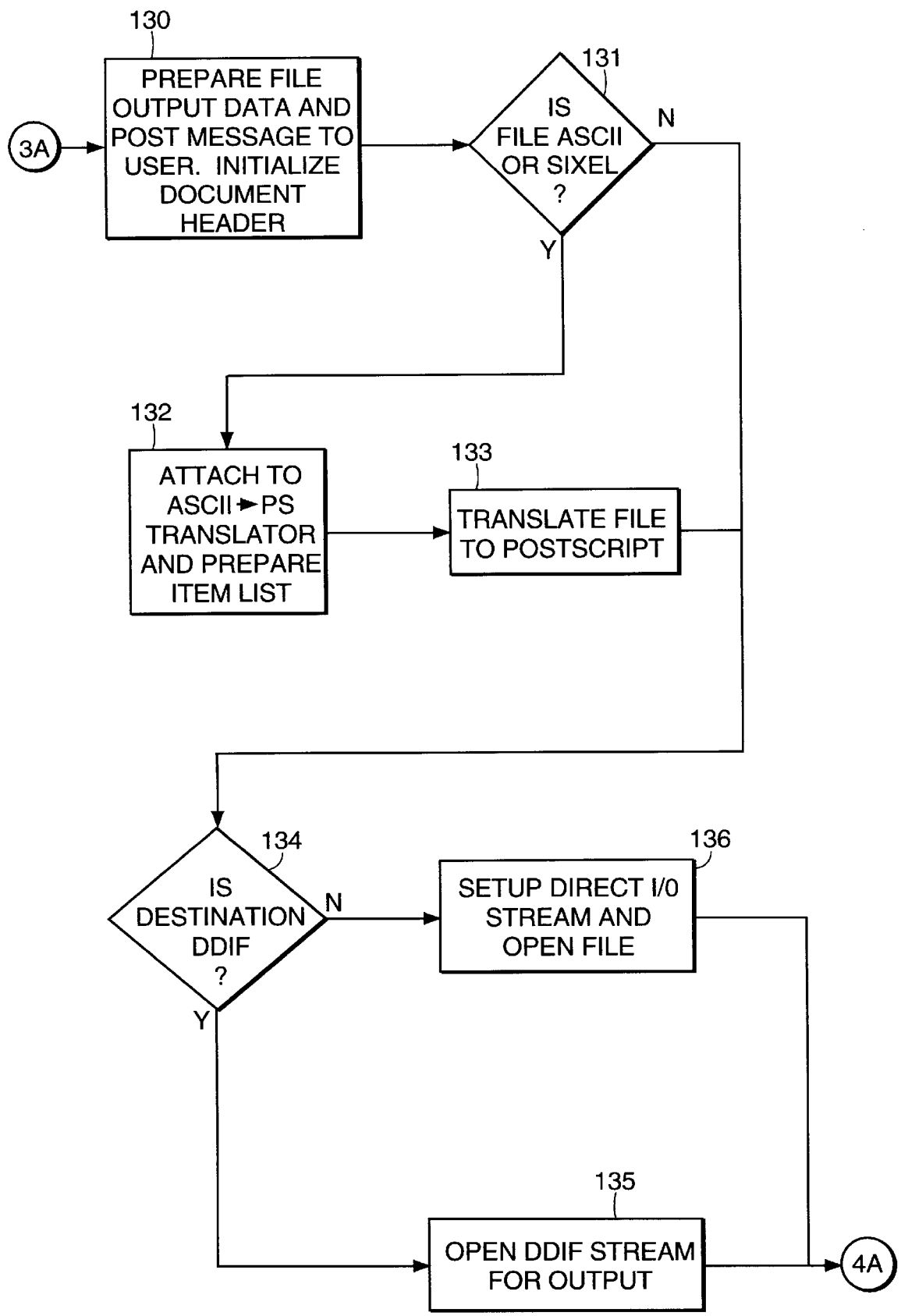

Referring to FIG. 9C, control of the program then passes to block 130. In block 130, the program prepares an output message for the user as to the status of the format request and initializes the document header for the output processed file. Control then passes to decision block 131. If the input file is an ASCII or Sixel file, control passes to block 132 where the program prepares the ASCII input file for translation to a postScript file. In block 133, the program actually converts the ASCII or PCL input file to a PostScript file.

In an alternate method of the present invention, the input file can be directly converted into an image file. One of the possible image data formats is an image services format as, e.g., the image services format marketed under the name Digital Document Interchange Format (DDIF). The rasterized image data is stored in this format and can be edited at a later time using image editing software. This software allows the user to change fonts, graphic details, background, etc. The ability to edit documents in DDIF format as opposed to PDL representation expands the flexibility and versatility of the print system according to the present invention.

Control of the program then passes to decision block 134. If the input file is to be converted into a Digital Document Interchange Format image (DDIF), control passes to block 135. In block 135, the program opens a DDIF stream for output of the input file. If the input file is not to be converted into a DDIF format, control passes to block 136, and the program sets up a direct I/O stream (see FIG. 6, I/O path 68) and opens a file for storing the rasterized image in the storage device 11. Control then passes to block 140 (FIG. 9D).

Figure 9D:
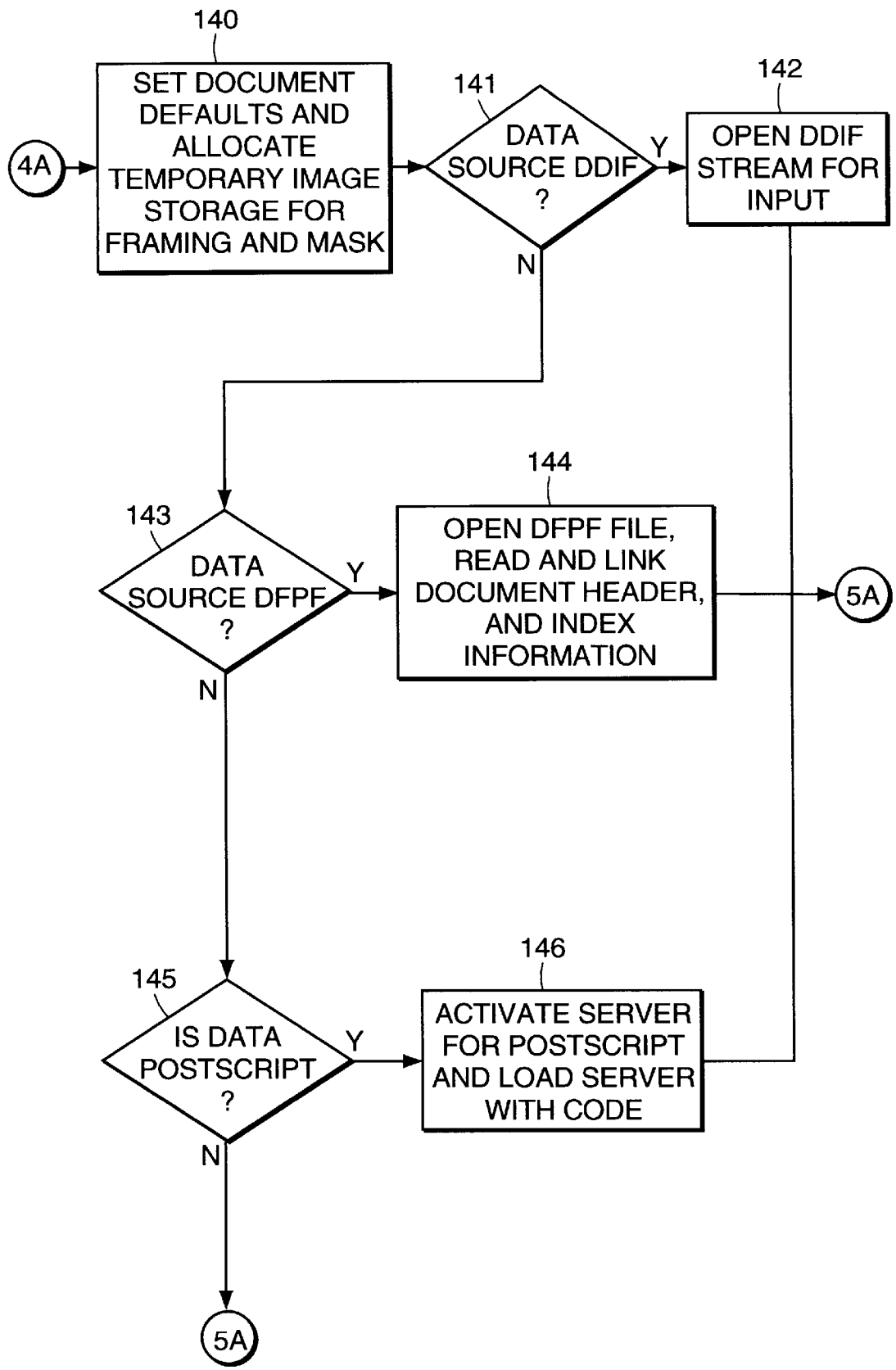

Referring to FIG. 9D, in block 140, the program sets document default values and allocates temporary storage for framing and mask images. Control then passes to decision block 141. If the input file is in DDIF format, control goes to block 142 where the program opens a DDIF input stream for the input file. If the input file is not in a DDIF format, control goes to decision block 143. If the input file is in a specialized document format, control passes to block 144, where the program opens a specialized file, reads in the header and index information, and sets up internal structures in memory to access the pages. This specialized document format can be a Document Final Print Format (DFPF). The DFPF format is an image format that can be readily understood by the printer interface 18. As an example, the DFPF format could be the proper image data format for the Kodak 1392. If the input file is not DFPF, DDIF, or any other specialized format, control passes to decision block 145. If the input file is in a PostScript file format, control passes to block 146 where the program activates a standard translator (which is known in the art) for the PostScript file and proper loop codes are loaded for the conversion of the input PostScript file pages to image data. Control then passes to decision block 151 (FIG. 9E).

Figure 9E:
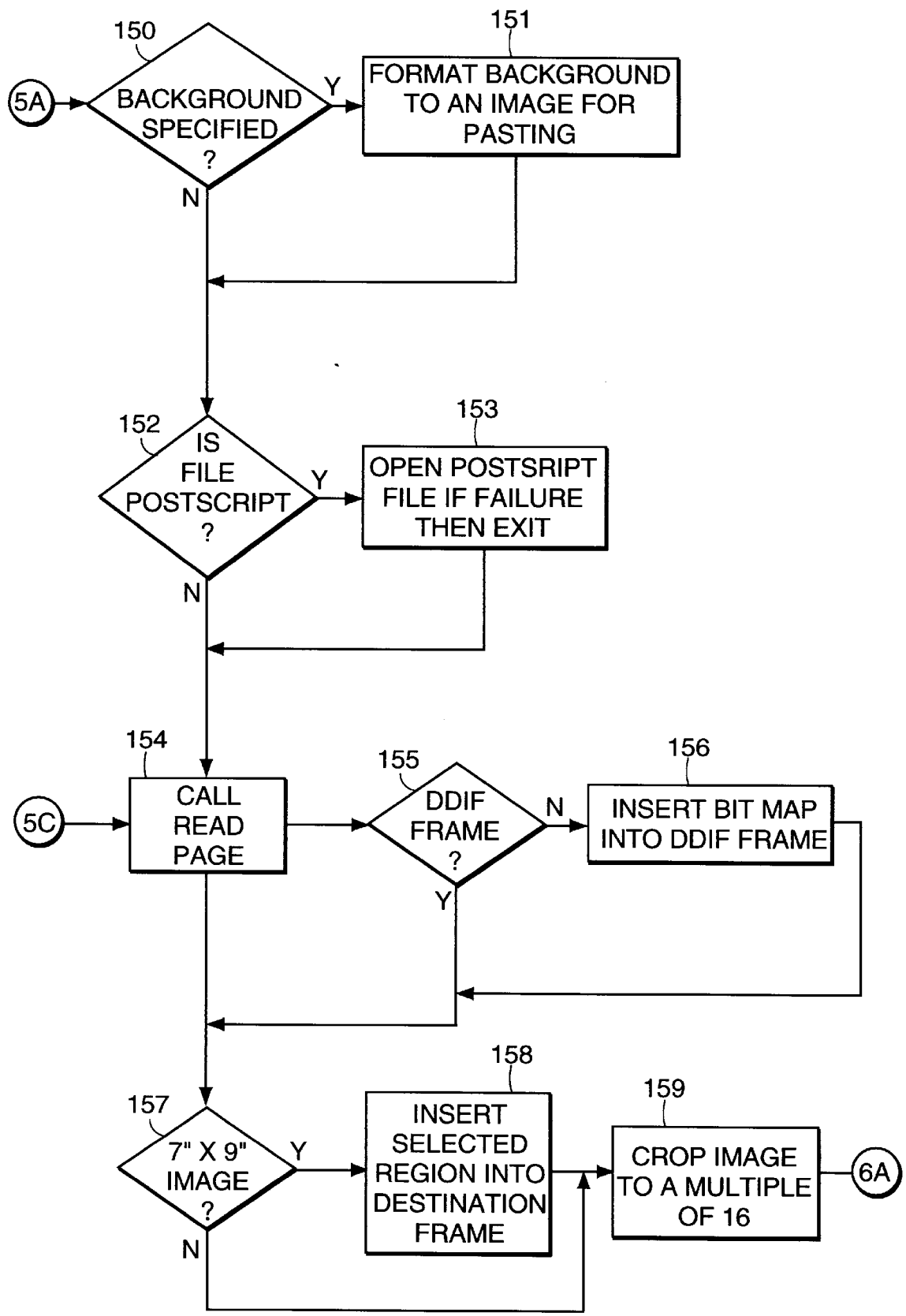

Referring to FIG. 9E, if background text was specified for the input file, control passes to block 151 where the background image is formatted so that it can be overlaid with other images of the input file. Control then passes to decision block 152. If the input file is in PostScript file format, control passes to block 153 where a file is opened for the input file. In block 153, if there is a failure to open this file, the program exits with an error message. Control passes to block 154, where the "read-page" subroutine is called. In this subroutine, if the input file is in ASCII, Postscript, or PCL, the input file is converted into a rasterized image as a bit map and framed so that it can be later modified. If the input file is already in a bit-image frame, the "read-page" subroutine will not change the input file. Control passes to decision block 155. If the image data is not already in an image services frame control passes to block 156 where the program inserts the bit map image into an image service frame. Control then passes to decision block 157. If the output image is a 7"×9" document, format control passes to block 158 where the program inserts the selected region into a destination frame. Control then passes to block 159. A cropping function is performed in block 159 on the bit map image to obtain a predetermined number of lines per page, e.g. an even multiple of 16 lines per page. Control then passes to decision block 160 (FIG. 9F).

Figure 9F:
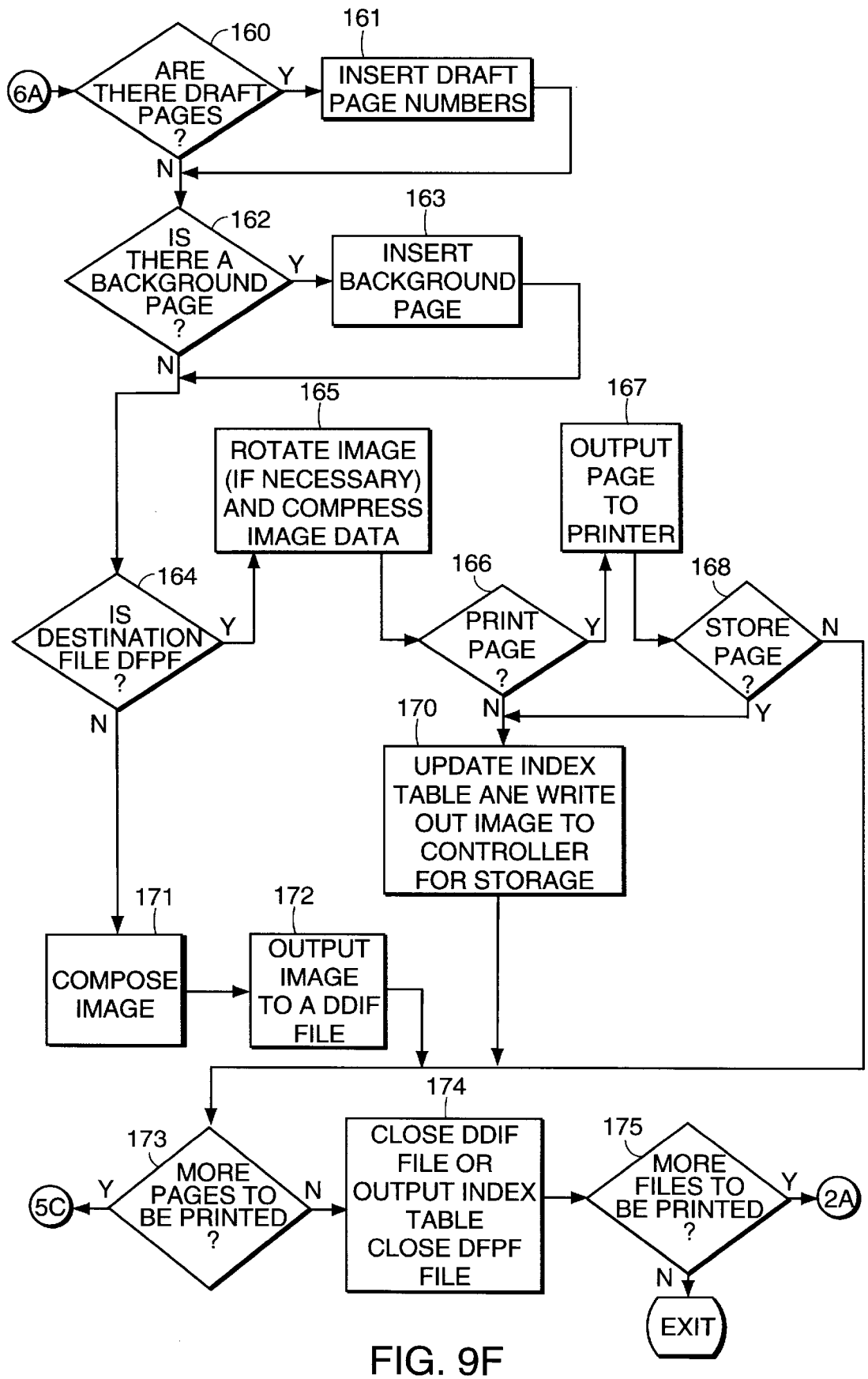

Referring to FIG. 9F, if the input file is a draft, control passes to block 161 where the page numbers are overlaid on to the bit image file. Control then passes to decision block 162. If there is a background image page, control passes to block 163 and the background page is overlaid onto the bit image page. Control then passes to decision block 164. If the destination file is to be in DFPF format, control passes to block 165, where the program compresses the bit image and rotates it 90 degrees for proper printing. Control then passes to decision block 166. If the page is to be printed, control passes to block 167 and the image data for the page is output to the printer. Control then passes to decision block 168. If the page is to be stored, control passes to block 170, where the index table is updated and the bit image data is stored in memory, i.e. the storage device 11. If the document is not to be printed, control also passes to block 170. If the destination file is not to be in DFPF format, control passes to block 171 where the image is compressed. The image is not rotated because it is already in proper orientation. Control passes to block 172 where the document is stored in the appropriate file, e.g. DDIF file. Control then passes to decision block 173. If the end of the file has not been reached control loops back to block 154 (FIG. 9E) and another page of the document is read in. If the end of the file has been reached, control passes to block 174 where all bit map files are closed. Control then passes to decision block 175. If there are more files to process, control loops back to block 120 (FIG. 9B) and the next input file is processed. If there are no more files to process the program is exited to system control.

Print Symbiont

A print symbiont is a high level print service that controls the actual printing of the bit map files. The print symbiont resides in the printer interface 18 and does no processing (i.e. it is in hibernation) until the job controller, for example a VMS operating system, sends a message to the print symbiont.

Figure 10:
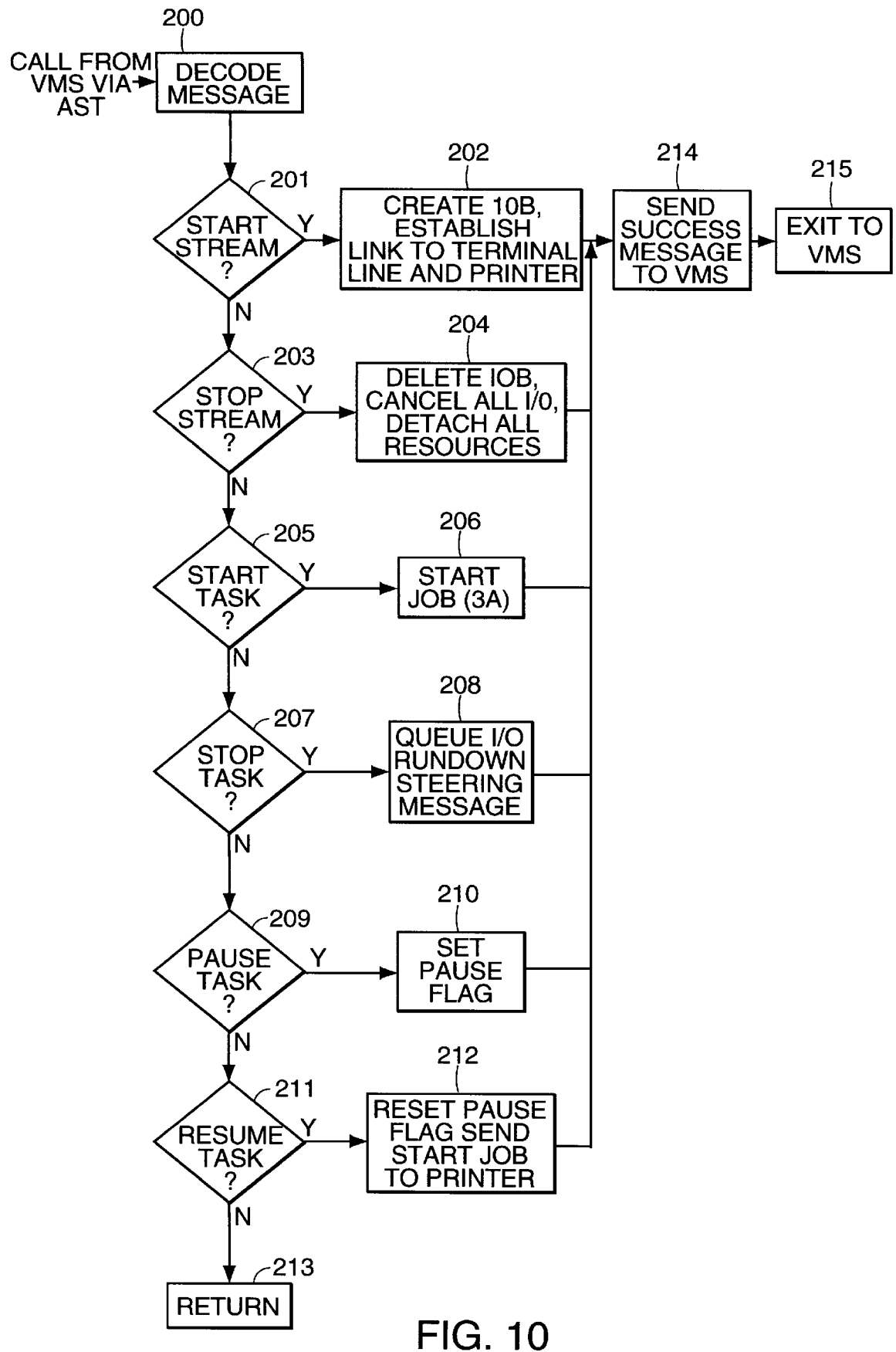
FIGS. 10–17 are a series of flow charts for the print symbiont subsystem according to the present invention.

Referring to FIG. 10, a message from the VMS operating system is sent to the print symbiont as an asynchronous system trap (AST). An asynchronous system trap is a routine that interrupts a running process upon the occurrence of an event and then executes.

In block 200, the program decodes the message and control passes to decision block 201. If the command is a "start stream" command, control passes to block 202 where the program creates an I/O block and establishes a link to a terminal line and a printer line of the printer 20. The terminal line is used for commands and the printer line is used for data. If the command is not a "start stream" command, control passes to decision block 203. If the command is a "stop stream" command, control passes to block 204 where the program deletes the I/O block and cancels the link to the terminal line and the printer. If the command is not a "stop stream" command, control passes to decision block 205. If the command is a "start task" command, control passes to block 206, where the program sets up the print job which will be discussed in reference to FIG. 12. If the command is not a "start task" command, controls passes to decision block 207. If the command is a "stop task" command, control passes to block 208 where the program queues an I/O rundown steering message which will be explained in reference to FIG. 17. If the command is not a "stop task" command, control passes to decision block 209. If the command is a "pause task" command, control passes to block 210 where the program sets a pause flag. Setting this pause flag causes the printer to halt its operations. A "start task" issued by the user will cause the printer operations to continue. If the command is not a "pause task" command, control passes to decision block 211. If the command is a "resume task" command, control passes to block 212 where the program resets the pause flag and the printer operations continue. The primary difference between the "pause task" command and the "resume task" command is that the "pause task" command is initiated by the user. The job controller can set the pause flag without the "pause task" command, and can reset this flag with the "resume task" command. If the command is not a "resume task" command, control passes to block 213 where the program returns control to the job controller and prints an error message. After a legitimate command has been executed, control passes to block 214 where the program sends a success message to the job controller and exits in block 215.

Figure 11:
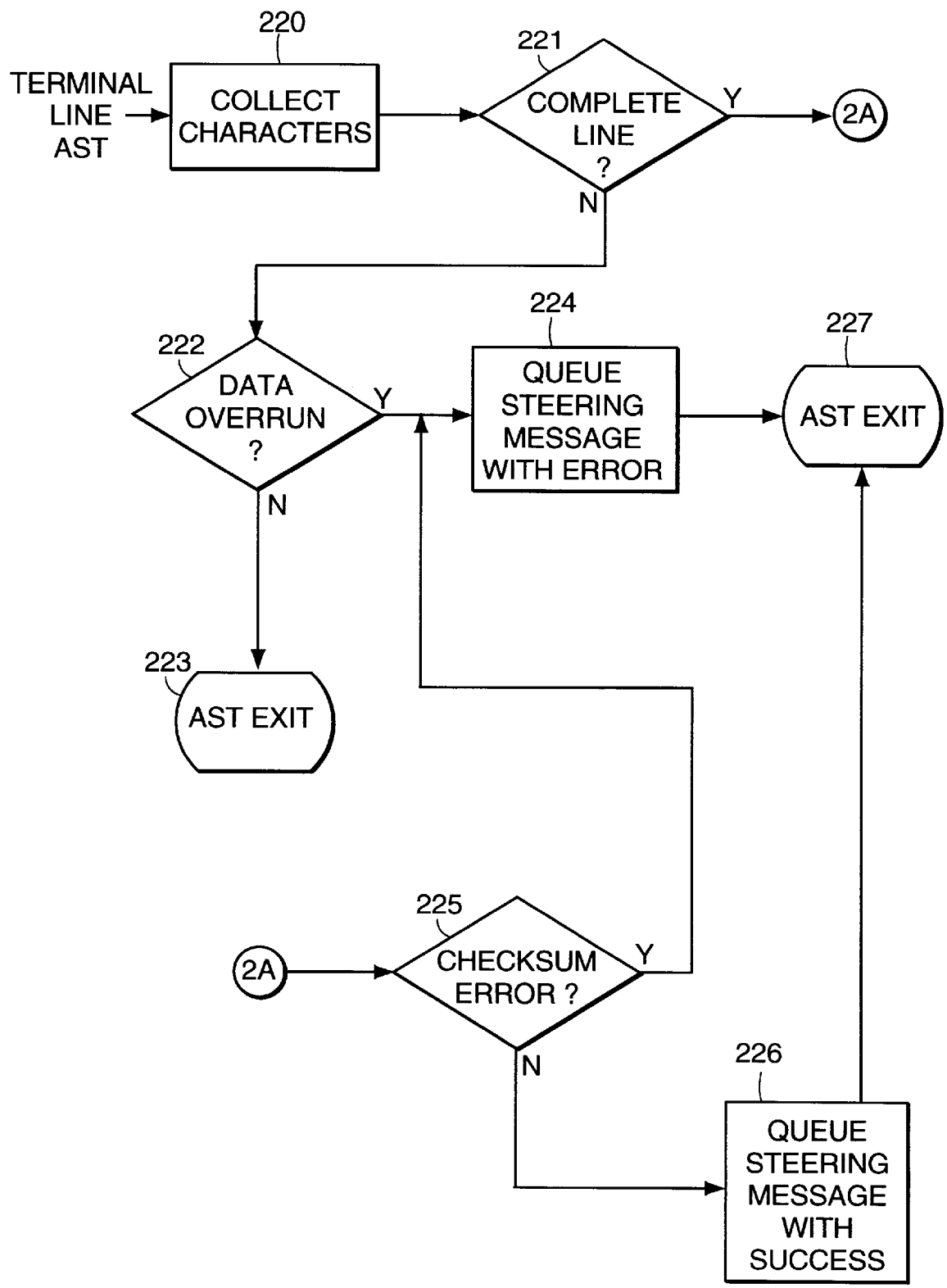

Referring to FIG. 11, the flow diagram for the terminal line input from the printer is shown. When a terminal line AST is executed, the program collects the command which comprises a set of characters as seen in block 220. Control then passes to decision block 221. If the command is incomplete, control is passed to decision block 222. If the incomplete command does not have a data overrun error, control passes to block 223 and an exit AST command is executed. If the incomplete command has a data overrun error, control passes to block 224 where the program queues a steering message with error.

A steering message is data information that is placed into a queue that is acted upon by the print symbiont. A steering message also posts an event to take the symbiont out of hibernation to act upon these messages. After the steering message has been queued, control passes to block 223 and an exit AST command is executed. If the command is complete, control passes to decision block 225. If the command has a checksum error, control passes to block 224. If the command does not have a checksum error, control passes to block 226, where the program queues a steering message with a message indicating success. Control then passes to block 227 and an exit AST command is executed.

Figure 12:
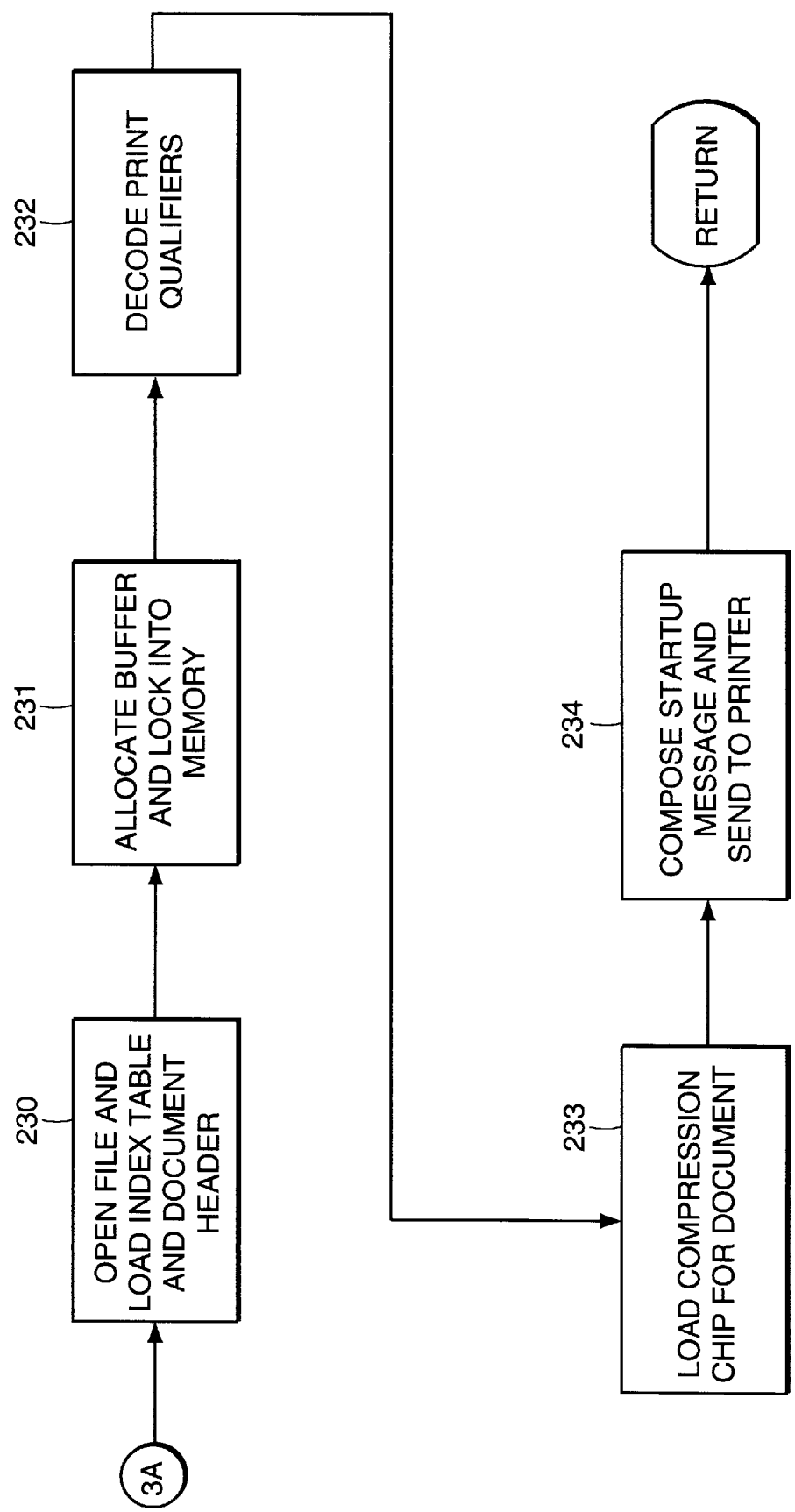

Referring to FIG. 12, the flow diagram for setting up a job is shown. When a "start task" command is sent from the user, control passes to block 206 (FIG. 10) which calls a job setup routine. Control passes to block 230 where the program opens a file and loads in all index tables and the document header. In block 231, the program allocates the appropriate buffers that are needed and locks these buffers into memory so that image data will remain in memory until the image data is sent to the printer interface 18. In block 232 all print qualifiers (e.g. double-sided or single-sided pages, special header page, etc.) are decoded. Once the document type has been determined a decompression chip is loaded with the appropriate parameters (e.g. CCITT group 31, 32, 42, etc.) in block 233. In block 234 a startup message is composed and sent to the printer. This startup message contains information such as the length of the document to be printed and what kind of paper is to be used. Control then returns back to block 206 (FIG. 10).

Figure 13:
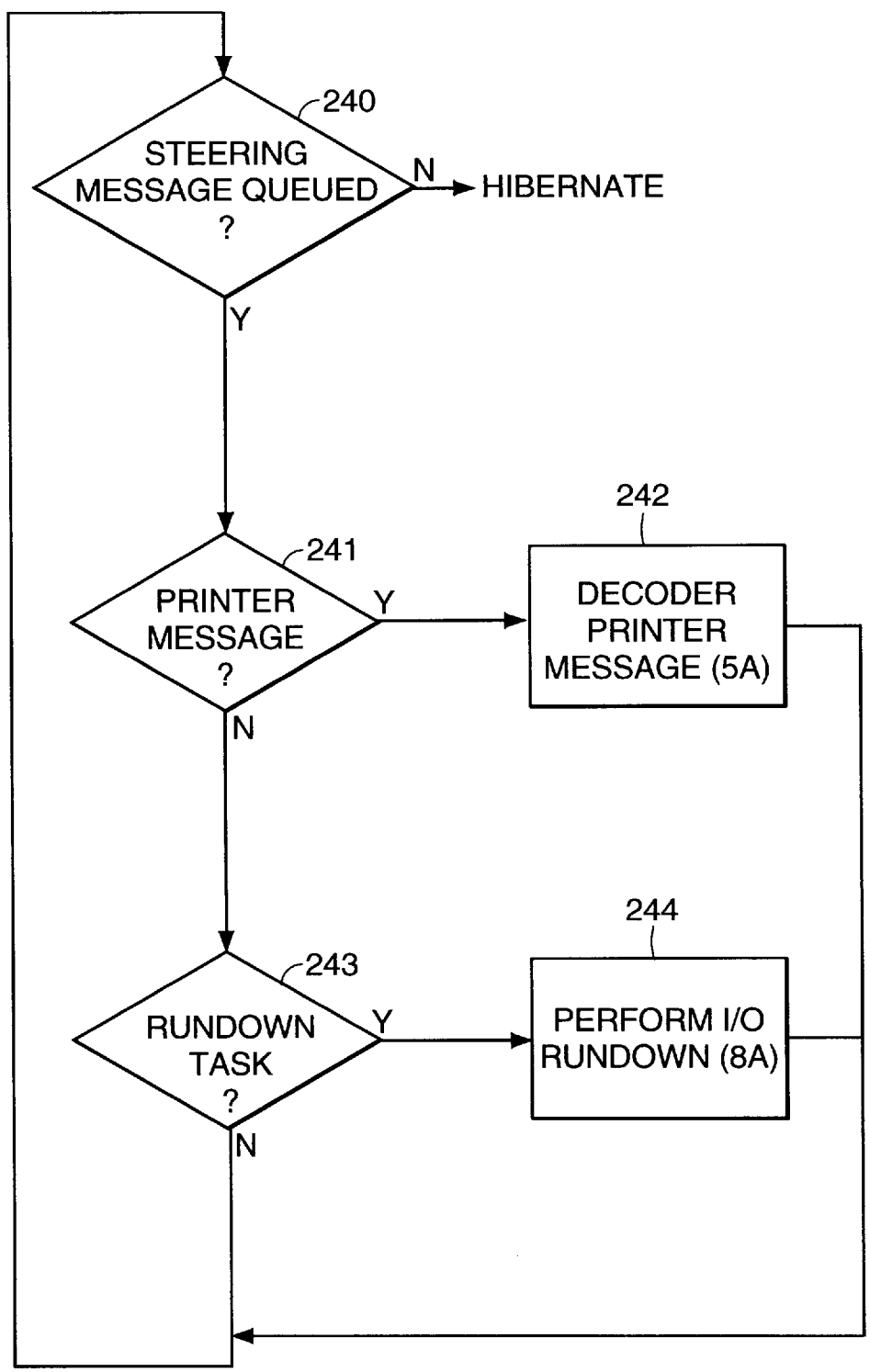

Referring to FIG. 13, the main processing loop of the print symbiont is shown. The print symbiont does no processing until the job controller sends a message. The print symbiont is said to be in a hibernate mode at this point. In decision block 240, the print symbiont remains in the hibernate mode until a steering message is queued. When a steering message is queued, control passes to decision block 241. If the steering message is a printer message, control passes to block 242 where the printer message is decoded. The processing of the printer message is described in reference to FIG. 14. If the steering message is not a printer message, control passes to decision block 243. If the steering message is a rundown task, control passes to block 244 where the program performs an I/O rundown. The processing of an I/O rundown will be described in reference to FIG. 17. After the printer message or rundown task has been processed, control returns back to decision block 240. If there are no more steering messages, the print symbiont goes back into a hibernate mode.

Figure 14:
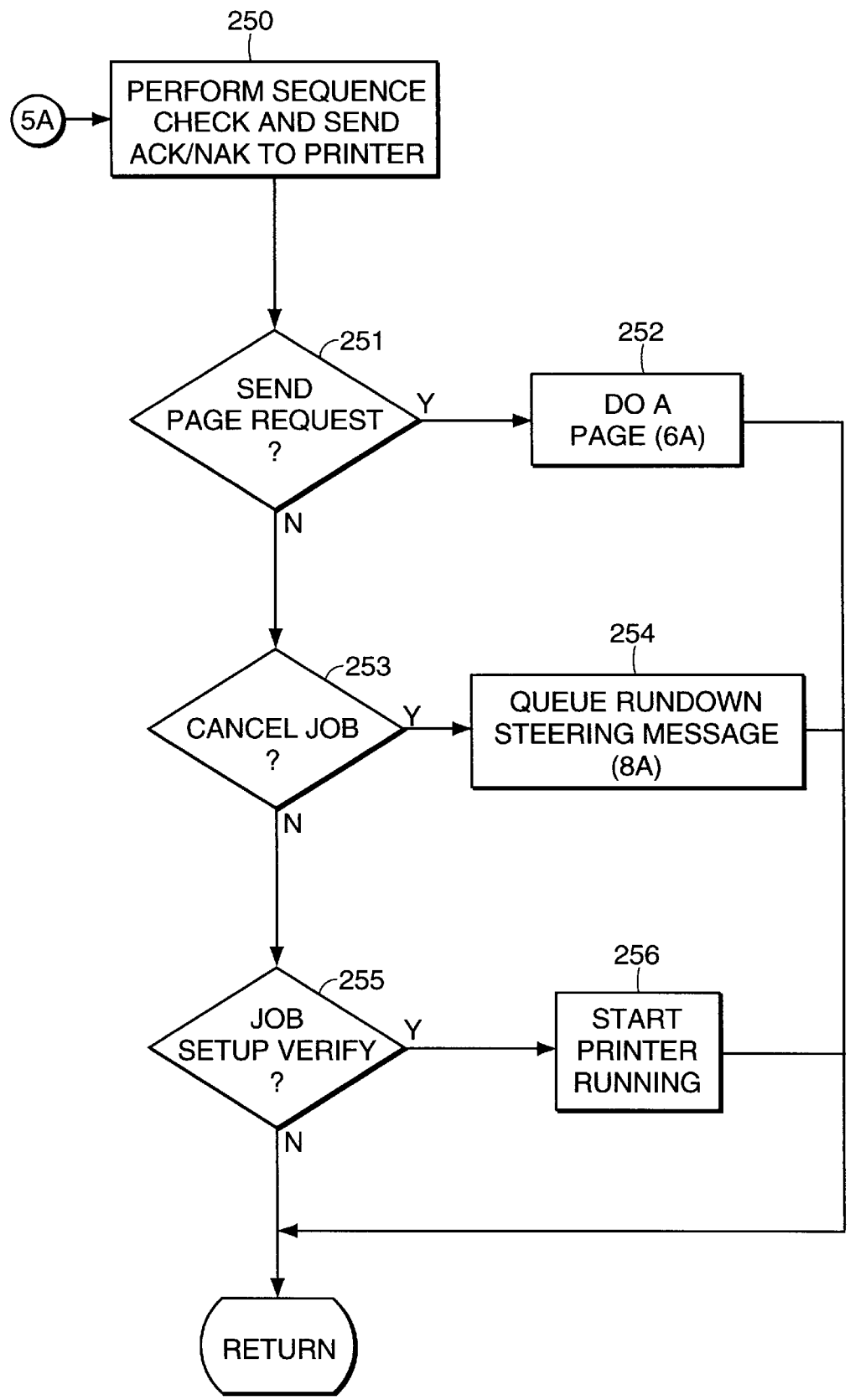

Referring to FIG. 14, the flow diagram for the processing of the printer message is shown for only a few of the printer messages. One skilled in the art would be able to add other printer messages to this section. Control is sent to process a printer message from block 242 (FIG. 13). In block 250, the program performs a sequence check on the protocol between the printer and the print symbiont and sends an acknowledge/no acknowledge message to the printer. Control then passes to decision block 251. If the printer message is a "send page request" message, then control passes to block 252, and a page request is performed. Processing of the page request will be described in reference to FIG. 15. If the printer message is not a "send page request", control passes to decision block 253. If the printer message is a "cancel job" message, control passes to block 254 and a queue rundown steering message is processed. The processing of the queue rundown steering message will be described in reference to FIG. 17. If the printer message is not a "cancel job" message, control passes to decision block 255. If the printer message is "job setup verify" message, control passes to block 256 where the program sends a message to the printer to start the job. A "job setup verify" message indicates that the printer qualifiers sent in block 234 (FIG. 12) were successful. After completing the processing of a printer message, control returns to block 242 (FIG. 13). If the printer message was not one of the messages discussed above or another available message, control also returns back to block 242 (FIG. 12).

Figure 15:
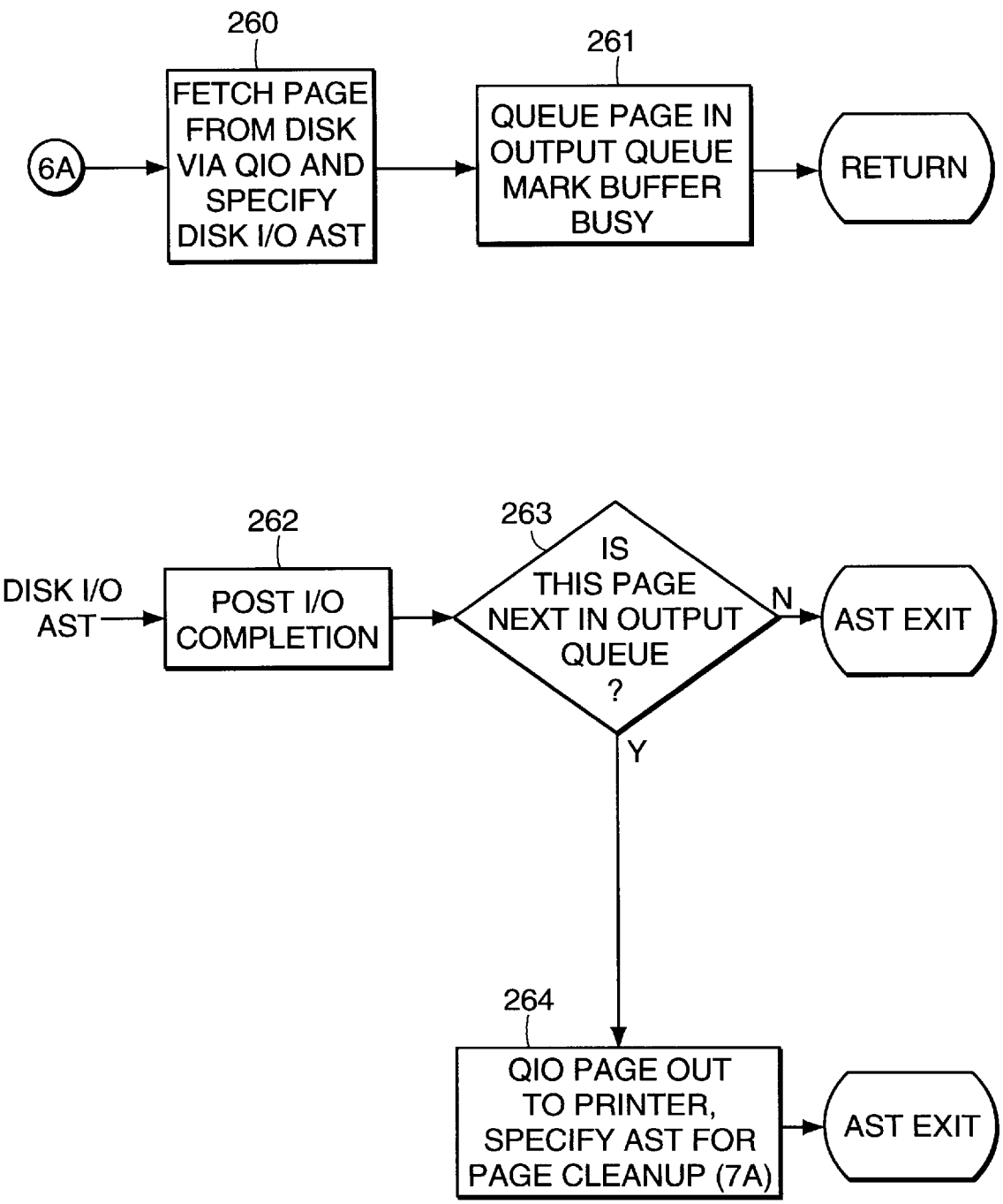

Referring to FIG. 15, the flow diagram for printing a page of a document is shown. Control is passed to block 260 from block 252 (FIG. 14) when a "send page request" is processed from the steering message queue (block 242, FIG. 13). In block 260, the program fetches one page of a document from one of the disks 36, 37 by setting up a Queue I/O request with a Disk AST for I/O completion. The input page is placed in the image output queue for the printer interface 18 and a flag is set to mark the buffer as busy block 261. Control then returns to block 252 (FIG. 13).

When the Disk I/O AST is processed, control passes to 262 where the program posts an I/O completion which checks the output queue for the next page. Control then passes to decision block 263. If the page that is in the output queue is the actual next page to be printed, control passes to block 264. If the page in the output queue is not the next page to be printed, the routine is exited until a new page is placed in the output queue. In block 264, a queue I/O request is executed and the next page to be printed is sent to the printer interface 18 for output. Also, a page-cleanup AST is specified for I/O completion of the page output to the printer interface 18. The page-clean-up AST will be described in reference to FIG. 16.

Figure 16:
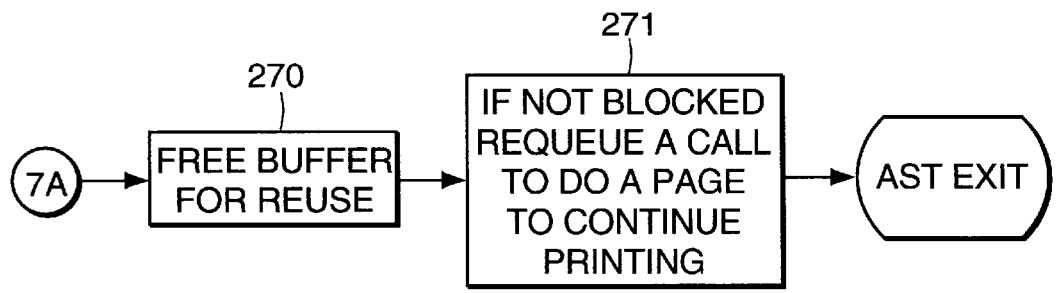

Referring to FIG. 16, the flow diagram for the page-clean-up AST is shown. When this AST is executed control passes to block 270 where used buffers are cleared for reuse. In block 271, if the printer is not blocked from printing pages, the symbiont subsystem attempts to print another page. This allows the printer to continuously print pages in the order they were inserted in the output queue. The program then issues an exit AST.

Figure 17:
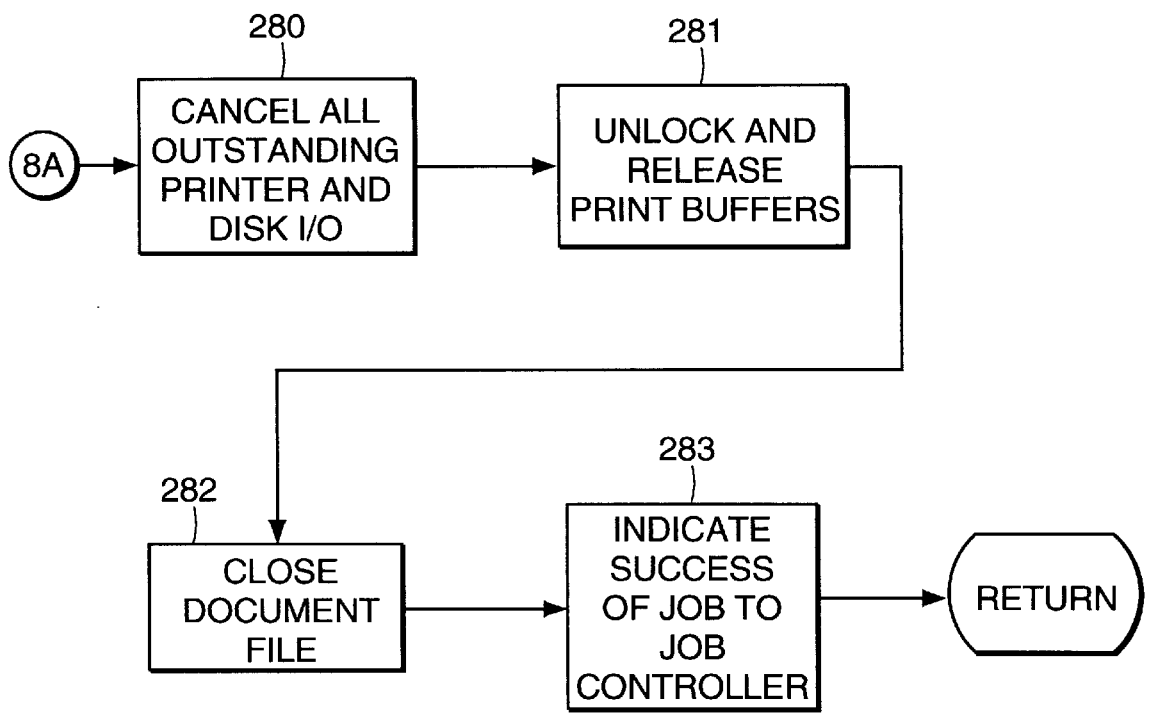

Referring to FIG. 17, the flow diagram for an I/O rundown is shown. Control passes to block 280 from block 244 (FIG. 13) when a "rundown task" message is processed in the steering queue. In block 280, the program cancels all outstanding printer and disk I/O messages. In block 281, the program unlocks the output queue for the printer and releases the print buffers. In block 282, the program closes the bit image document file. In block 283, the program sends a message to the job controller indicating the success or failure of the job. After this processing, control returns back to block 244 (FIG. 13).

The above described embodiment of the invention is meant to be representative only, as certain changes may be made therein without departing from the clear teachings of the invention. Accordingly, reference should be made to the following claims which alone define the invention.

What is claimed is:

1. A printing system, comprising:
   a network;
   a printer on the network;
   a first and a second translator on the network, the first translator receiving a first whole print job, the first whole print job setting out all data to be printed for a print request, and the second translator receiving a second whole print job, the second whole print job setting out all data to be printed for a second print request, the translators translating the whole print jobs into image data format, each translated whole print job producing an entire page when printed, and each translator sending the whole print job translated into image data format by that translator over the network; and
   a printer interface on the network for receiving and sending the whole print jobs in image data format to the printer.

2. The printing system according to claim 1 further comprising a print controller coupled to said translators for assigning whole print jobs to each of said translators.

3. The printing system according to claim 2 wherein one of the translators operates to translate whole print jobs from a page description language format to the image data format.

4. The printing system according to claim 3 wherein each one of said translators includes a plurality of processors.

5. The printing system according to claim 1 wherein the printer interface includes an adapter for coupling the printer interface to the network.

6. A method for printing over a network, comprising the steps of:
   requesting a first print job, the first print job setting out all data to be printed for the first print job request;
   requesting a second print job, the second print job setting out all data to be printed for the second print job request;
   providing the first print job in its entirety to a first single translator over the network;
   providing the second print job in its entirety to a second translator over the network;
   translating the first print job at the first translator into image data format, the translated first print job producing an entire page when printed;
   sending the translated first print job over the network to a printer;
   translating the second print job at the second translator into image data format, the translated second print job producing an entire page when printed; and
   making the translated second print job available to the printer for use by the printer upon completion of printing the translated first print job.

7. A method for printing over a network, comprising the steps of:
   requesting a first print job, the first print job setting out all data to be printed for the first print job request;
   requesting a second print job, the second print job setting out all data to be printed for the second print job request;
   providing the first print job in its entirety to a first single translator over the network;
   providing the second print job in its entirety to a second translator over the network;
   concurrently translating the print jobs into image data format, each translated print job producing an entire page when printed; and
   sending each translated print job over the network to a printer according to a predetermined ordering scheme.

8. The method of claim 6, further comprising the steps of:
   sending the translated second print job over the network to the printer; and
   printing the translated second print job after completely printing the translated first print job.

9. A printing system, comprising:
   a network;
   a printer on the network;
   a device on the network, the device issuing print jobs upon request for printing on the printer;
   a first translator on the network, the first translator receiving a first print job in its entirety, the first print job setting out all data to be printed for a print request, the first translator translating the first print job into image data format, the translated first print job producing an entire page when printed, the first translator sending the translated first print job over the network to the printer; and a second translator on the network, the second translator receiving a second print job in its entirety, the second print job setting out all data to be printed for a second print request, the second translator translating the second print job into image data format, the translated second print job producing an entire page when printed, the second translator making the translated second print job available to the printer for use by the printer upon completion of printing the translated first print job.

* * * * *